US012750218B1

(12) United States Patent
Devarajan et al.

(10) Patent No.: US 12,750,218 B1
(45) Date of Patent: Sep. 29, 2026

(54) ESTABLISHMENT OF TRUST BETWEEN CONNECTED NETWORK DEVICES

(71) Applicant: Amazon Technologies, Inc., Seattle, WA (US)

(72) Inventors: Vivek Krishnan Devarajan, Seattle, WA (US); Qiwei Zhou, Seattle, WA (US); Luis Fernando Gonzalez Fernandez, Seattle, WA (US); Tuhin Gupta, Seattle, WA (US); Jonathan Squire, Manasquan, NJ (US); Colin Whittaker, Dublin (IE); William Bennett, Omaha, NE (US); Ke Zhang, Cupertino, CA (US); Joseph Papa, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 197 days.

(21) Appl. No.: 18/622,189

(22) Filed: Mar. 29, 2024

(51) Int. Cl.
*H04L 9/30* (2006.01)
*H04L 9/32* (2006.01)

(52) U.S. Cl.
CPC .............. *H04L 9/30* (2013.01); *H04L 9/3263* (2013.01)

(58) Field of Classification Search
CPC ................................ H04L 9/30; H04L 9/3263
USPC .......................................................... 713/171
See application file for complete search history.

(56) References Cited

U.S. PATENT DOCUMENTS

2022/0124074 A1* 4/2022 Petri .................... H04L 63/0485
2023/0109231 A1* 4/2023 Adogla .................... H04L 41/40
709/223

* cited by examiner

*Primary Examiner* — Bryan F Wright
(74) *Attorney, Agent, or Firm* — Perilla Knox & Hildebrandt LLP; Thomas B. Hildebrandt

(57) ABSTRACT

Techniques for switches to establish trust with connected network interface cards (NICs) without the need of authorization servers. When an unauthorized NIC of a server is connected to a port of a switch, the switch provides port security such that hosts running on the server are unable to gain unauthorized access to resources. The switch may apply a default ACL to unauthorized NICs that allows limited communications, such as only communications to foundation services. The switch may establish trust with NICs using Public Key Infrastructure (PKI) vended identities. The unauthorized NIC may perform an attestation handshake with a PKI service to receive an identity certificate. A root certificate of a PKI service is stored on the switch which is used by the switch to verify the identity certificate of the NIC. Once authorized, the switch may construct ACLs that permit the NIC to communicate with other resources.

20 Claims, 13 Drawing Sheets

600

ESTABLISHMENT OF TRUST BETWEEN CONNECTED NETWORK DEVICES

BACKGROUND

Many organizations maintain networks of managed computing resources and functionality to process, store, and communicate data for various purposes. For instance, private enterprises, cloud providers, governmental agencies, Internet service providers (ISPs), and telecommunications companies manage computing systems to exchange data and achieve their purpose and strategic goals. These computing systems often include data centers which are located across disparate geographic regions and interconnected by a communication network, or a series of communication networks. Data centers are centralized facilities designed to house computing infrastructure, including servers, storage systems, networking equipment, and other hardware essential for processing, storing, and disseminating data. The amount of computing resources provided by these data centers or data processing centers can scale based on the number of interconnected computing devices (or "servers") that provide the computing resources to users of the computing networks.

To facilitate communications between the devices in the data center networks (e.g., servers, routers, etc.), network switches are used to receive, process, and forward packets to intended destination devices, and from source devices located in the data center networks. As an example, a switch is a networking device used to connect servers or other equipment in a single rack, and has traditionally been positioned at the top of a server rack (e.g., Top-of-Rack (TOR) switch). Switches are used to aggregate network connections from servers in the same rack and provide the servers with connectivity to other devices in the data center networks, and networks exterior the data center networks. Data center operators can add servers to a server rack and use cables to physically connect network interface cards (NICs) of the servers with physical ports of the switches.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
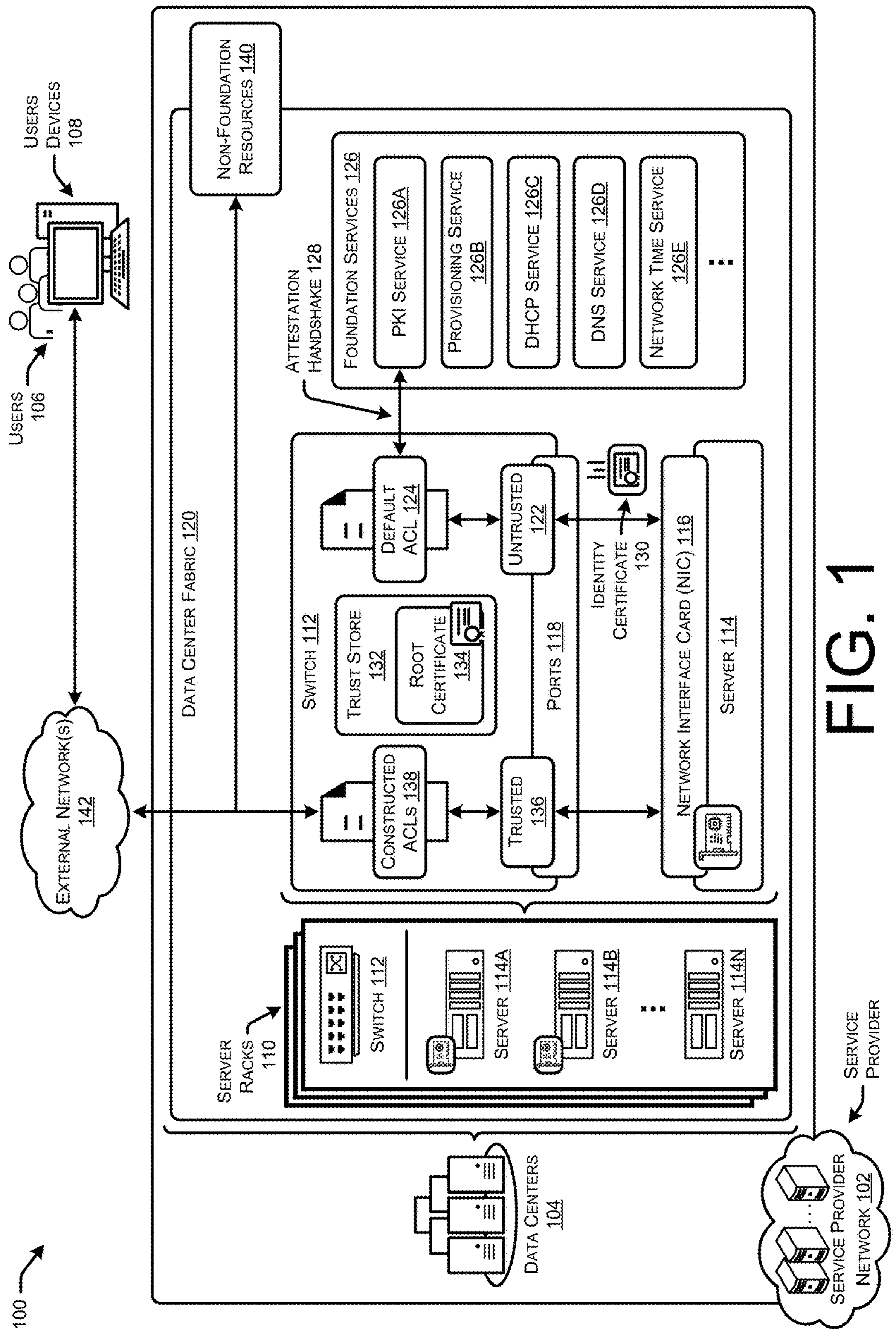
FIG. 1 illustrates a system-architecture diagram of an example environment in which a switch establishes trust with a network interface card (NIC) that has been physically connected to a port of the switch.

This disclosure describes techniques for a switch in a data center to establish trust with connected network interface cards (NICs) without the need of a third-party authorization server. When an unknown or unauthorized NIC of a device (e.g., server) is connected to a port of a switch, the switch may be configured to provide port security such that hosts running on the server are unable to "break out" and gain unauthorized access to resources. Traditionally, switches have provided port security by auto-learning the Media Access Control (MAC) addresses of NICs, associating the MAC addresses with specific ports (e.g., Sticky MAC), and applying access control lists (ACLs) to the ports. However, these techniques cannot ensure port security because MAC addresses are easy to spoof, and there also may be instances where the host is migrated to a different port on the switch (or the NIC is replaced) and the learned MAC address and the ACL policies tied to the port are no longer valid and will prevent the attached host from bootstrapping. Further, network operators often experience various difficulties when provisioning NICs, such as ensuring that the NICs are authentic and have not been tampered with, bootstrapping hosts when they migrate between hosts, and applying network policies after hardware upgrades.

According to the techniques described herein, switches may achieve port-based authentication by establishing trust with NICs using Public Key Infrastructure (PKI) vended identities. To achieve this, a root certificate of a PKI service is stored on the switch such that the switch becomes a trust anchor for the PKI service (which eliminates the need for a trusted third-party, such as a RADIUS server). The switch may apply a default ACL to all ports that only allow limited communications for unauthorized NICs, such as only allowing communications to foundation services (e.g., PKI, Provisioning, etc.). An unauthorized NIC may perform an attestation handshake with the PKI service to receive an identity certificate that include network attributes for interfaces of the NICs, such as IP addresses and a MAC address that the NIC is authorized to use. The switch can then verify the identity certificate of the NIC using the root certificate, and construct ACLs that permit the NIC to communicate with other resources.

To achieve the techniques described herein, a PKI root certificate will be stored locally on the switch such that the switch acts as the PKI trust anchor. In some instances, the root certificate may be published to the switch as part of software packages and provided to the switch using a secure update or upgrade. The switch may store the root certificate in a secure persistent storage area (or "pstore"), such as being cached in the pstore. However, the root certificate (or certificates) may be stored in other secure storage locations, such as a trusted platform module (TPM), secure enclaves, or trusted execution environments (TEEs). In this way, the switch is able to verify or validate digital certificates representing authenticated identities of the NICs.

Generally, the switch may initialize all hardware ports into an untrusted state, such as when no traffic is detected (e.g., link down state) or when a link up event is detected on a port where an unknown or unauthorized NIC (or other device) has connected to a port of the switch. While in the untrusted state, the switch may apply default network policies to traffic received on the port, such as a default ACL. The default ACL may essentially serve as a mechanism to "jail" NICs until they have been authorized. For instance, the default ACL may only allow unauthorized NICs to communicate with certain services or resources, such as allowing certain communications to be sent to foundation services (e.g., Dynamic Host Configuration Protocol (DHCP) communications, Link Layer Discovery Protocol (LLDP) communications, communications to provisioning services, etc.). However, the default ACLs may prevent the unauthorized NIC from communicating with other services or resources until the NIC has become authorized.

The switch may allow the NIC to send service discovery messages, or various advertisement messages, under the default ACL. For instance, the NIC may utilize a User Datagram Protocol (UDP) packets, LLDP packets, and/or other protocols to send advertisement packets that announce the NIC being introduced into the data center network. The advertisement (or discovery) packets may be sent to a PKI service in the data center network, and the NIC and PKI service may perform techniques to authenticate the NIC. For example, the NIC may perform a security handshake, such as a Transport Layer Security (TLS) handshake or a custom challenge, with the PKI service. The PKI service may use the handshake process as a mechanism to attest to the identity of the NIC, and verify the identity and trustworthiness of the NIC. In response to successfully verifying the NIC, the PKI service may provide a digital certificate, such as a public identity certificate, that indicates an authenticated identity of the NIC and that validates to the root chain of the root certificate stored on the switch.

In some examples, the PKI service may insert certificate metadata into the digital certificate (also referred to herein as "identity certificate"), such as the Internet Protocol (IP) addresses that the NIC is allowed to claim and use, the MAC address that is authorized for the NIC and the connected port. The certificate metadata may include, for instance, a series of port-IP-address entries or other attributes of the interfaces associated with the NIC (e.g., interface name, IP address of the interface, MAC address of the interface, floating IP addresses, etc.). Further, the certificate metadata may include indications of network policies that are to be applied for the NIC. For instance, the identity certificate may include a network policy label that indicates which network policies, such as which ACLs, should be applied for the NIC.

Once the NIC receives the identity certificate, the NIC may provide the identity certificate to the switch. The NIC and switch may utilize various protocols in order to exchange the identity certificate. Generally, however, the NIC and switch may establish a cryptographic connection, such as a TLS or Datagram TLS (DTLS) connection, using the identity certificate. As an example, the switch may use a TLS handshake, or another cryptographic protocol, designed to establish secure communication over the network. As part of the TLS handshake, the NIC needs to provide its identity to the switch, and to prove its identity is needs to send the identity certificate to the switch. Accordingly, the switch may periodically or continuously poll the NIC, and the NIC may run a Constrained Application Protocol (CoAP) server that supports TLS natively. The switch may poll, such as by using CoAP calls, the NIC for the identity certificate, and the CoAP server (NIC/server) sends the identity certificate to establish trust. Once the identity certificate is obtained at the switch, the switch may stop polling. In some examples, the TLS handshake is a limited handshake that terminates once the identity certificate from the server is received. In such examples, a symmetric key may not be utilized for further encryption.

In some examples, the NIC may send its identity certificate in an LLDP message to the switch that includes a Type-Length-Value (TLV) field, such as an identity TLV field, in which the identity certificate is contained as data. The switch may receive the message from the NIC, and use the root certificate to verify a certificate chain of the identity certificate as belonging to the root certificate. Once the identity certificate has been verified, the switch may extract the metadata from the identity TLV in order to determine or construct network policies for the NIC.

In some examples, the switch may use the network policy label stored in the identity TLV to identify network policies, such as ACLs, that are stored locally on the switch. The identified network policies may then be applied on the port to which the NIC is connected. In some instances, the switch may extract the IP addresses and MAC address from the identity TLV to construct ACLs and/or other network policies. For instance, certain traffic may be allowed for the IP addresses and MAC address that are bound to the port and the NIC is allowed to use.

The switch may send back an authentication status message to the NIC that indicates that the NIC has been authenticated using the identity certificate (or not authenticated if the verification of the identity certificate fails). For example, the switch may send back an LLDP message that includes an authentication status TLV that conveys the authentication status of the port. In examples where the identity exchange succeeded, the authentication status TLV will carry the port status as "Trusted," and otherwise, the port status will remain "Untrusted." In some examples, this message (e.g., Protocol Data Unit (PDU)) can be used to detect a "heartbeat" of the NIC by determining that the NIC is still connected and responsive, and/or to collect telemetry data.

The NICs may not have any certificates in their persistent store, so when NICs are provisioned for the first time, the PKI service may provide identities to the NICs before they are able to establish trust with the switches. However, once a NIC is certified, the certificates may be valid for a period of time (e.g., 90 days, 120 days, etc.), and subsequent identity exchanges with the switch may occur without involvement of the PKI service.

Although some of the techniques described herein are with reference to applying ACLs in ports and for NIC, the techniques are generally applicable for any type of network policies, such as Quality of Service (QoS) policies that define QoS metrics for traffic sent via the port, as well as any type of traffic limiter policies (e.g., rate limiter policies, traffic shaping policies, traffic policers, etc.). Further, the techniques are described with reference to a NIC and switch relationship, but the techniques are applicable for any type of networking device where the trust anchor device is able to "jail" or control communications of the device asserting their identity. For instance, the trust anchor device may be a router than limits what traffic is sent to external networks from any network device internal to a Local Area Network (LAN) (e.g., gateway, switch, etc.).

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram of an example environment 100 in which a switch establishes trust with a network interface cards (NIC) that has been physically connected to a port of the switch.

In some instances, the techniques may be performed by or in a service provider network 102 that is operated and/or managed by a service provider may provide various services to users to fulfil their computing resource needs, such as cloud-based computing resources. For example, the service provider network 102 may include networks of data centers 104 that provide cloud-based, scalable, and network accessible compute power services, storage services, database services, and/or other services. Users 106 may subscribe for use of the computing resources and/or services provided by the service provider network 102. The service provider network 102 may include, manage, own, or otherwise be associated with a computing-resource network that is comprises of a network of data centers 104. However, the techniques are applicable in any type of networks and not limited to service provider networks 102 or data centers 104. For instance, the techniques may be applied in enterprise networks, access networks, wide area networks (WANs), LANs, and/or any type of network managed by any type of network provider.

The service provider network 102 may span across different geographic regions, and include or be associated with server racks 110 storing switches 112 and clusters of managed computing devices, such as servers 114, stored in data centers 104 located across the different geographic regions. In this way, users 106 who have subscribed for use of the network-based services supported by computing resources in the data centers 104 need not invest in and maintain the computing infrastructure required to implement the various services that they may need. In some examples, users 106 of the service provider network 102 may access or utilize computing resources of the servers 114 (and/or any computing device) in the data centers 104 located in different geographic regions such that users located in these different geographic regions are provided with access these resources and services.

The switches 112 described herein may be any type of switch, such as modular switches, fixed-configuration switches, unmanaged switches, managed switches, smart switches, ToR switches, stackable switches, standalone switches, Layer 2 (L2) switches, and/or Layer 3 (L3) switches. The switches 112 generally connect devices within a network, such as the data center fabric 120 (or "data center network") or other LANs. The switches 112 may perform various functions, such as packet forwarding based on MAC addresses found in the Ethernet frame headers, maintain MAC address tables for efficient routing, and create separate collision domains to minimize network congestion, filtering unnecessary traffic and supporting virtual LANs for network segmentation, optimizing network performance and security. Additionally, the switches 112 may be configured to apply network policies to devices communicating on ports 118 of the switches, such as QoS policies to prioritize critical traffic and ACLs, and also using a Spanning Tree Protocol (STP) to prevent network loops and ensures stability.

The ports 118 on a switch generally refer to the physical connectors on the switch 112 where network cables can be plugged in to connect end devices such as computers, servers, routers, or other switches. Each port 118 on the switch 112 may correspond to a specific network interface and represent a point of connection for a network device (e.g., NIC 116 of a server 114). The ports 118 on the switch 112 may adhere to Ethernet standards and may support various speeds (e.g., 10/100/1000 Mbps or Gigabit Ethernet) and connector types (e.g., RJ-45 Ethernet ports or SFP/SFP+ ports for fiber optic connections). The ports 118 allow devices to communicate with each other within the data center fabric 120 or other LAN, and enable the switch 112 to forward data packets between connected devices based on their MAC addresses.

Generally, the servers 114 may be located in server racks 110 in the data centers 104 and may provide various types of computing resources, such as compute (CPU) resources (e.g., central processing units (CPUs) for processing data), memory resources (e.g., physical devices capable of storing information such as RAM or ROM), storage resources (e.g., disk storage or drive storage used to store data by various electronic, magnetic, optical, or mechanical changes to a surface layer of one or more rotating disks), graphics compute (GPU) resources (e.g., graphics processing units (GPUs)), and/or network throughput resources (e.g., average or measured rate of bit transmission per second over networks). The servers 114 may be various types of computing devices, such as devices that have different chip set generations, are from different vendors, have different hardware architectures, and so forth.

In some instances, the servers 114 may have one or more NICs 116 installed thereon. The NICs 116, which may also be referred to as network adapters or network interface controllers, are hardware components that allow the server 114 (or other end devices) to connect to a port 118 of the switch 112. The NICs 116 may be installed inside a server 114 and provide the physical connection between the server 114 and the switch 112. The NICs 116 may be expansion cards that are inserted into expansion slots on motherboards, integrated network interfaces built directly into the motherboards, or external adapters that connect via USB or other interfaces. The NICs may include one or more network ports (e.g., Ethernet ports or Wi-Fi antennas) and may support different data transfer rates and network standards depending on the specific requirements of the data center fabric 120.

The servers 114 and other computing resources of the data center fabric 120 can include, for example, any hardware computing device resources, such as processor computing power/capacity, read-only and/or random-access memory, data storage and retrieval systems, device interfaces such as network or peripheral device connections and ports, and the like. In some embodiments, these resources may be dispersed among multiple discrete hardware computing devices (e.g., servers 114), and these hardware servers 114 may implement or communicate with a virtualization layer and corresponding virtualization systems (e.g., a hypervisor on a server), whereby the compute resources are represented by, and made accessible as, virtual computing resources, such as instances of virtual machine or "VM instances." A virtual computing resource may be a logical construct, such as a data volume, data structure, file system, and the like, which corresponds to certain compute resources. Non-limiting examples of virtual computing resources include virtual machines and containers (as described below), logical data storage volumes capable of storing files and other data, software programs, data processing services, and the like.

In some instances, the data center fabric 120 may include or be associated with one or more foundation services 126, such as a PKI service 126A, a provisioning service 126B, a DHCP service 126C, a DNS service 126D, network time service 126E, and/or other services. The PKI service 126A may issue digital certificates to entities, such servers 114 and NICs 116. The certificates may contain public keys, identity information, and other attributes, and are signed by a trusted Certificate Authority (CA) to establish their authenticity and validity. The PKI service 126A may generate a root certificate 134, which serves as the root of trust for the entire PKI hierarchy. The root certificate 134 may contain a public key and identifying information (such as the name of the organization or CA) and is self-signed, meaning it is signed using its own private key. This root certificate 134 is then securely stored and used to sign other certificates within the PKI. In some instances, the root certificate 134 may be distributed to entities and systems, such as the switch 112, that need to verify the authenticity of certificates issued by the PKI service 126A.

The root certificate 134 may be distributed using secure channels, such as offline distribution through physical means or online distribution through secure websites or protocols. In some instances, the root certificate 134 may be published to the switch 112 as part of software packages and provided to the switch 112 using a secure update or upgrade. The switch 112 may store the root certificate in a trust store 132, which may be a secure persistent storage area, such as being cached in a pstore. However, the root certificate 134 (or certificates) may be stored in other secure storage locations, such as a TPM, secure enclaves, or TEE. In this way, the switch 112 is able to verify or validate digital certificates representing authenticated identities of the NICs 116. Thus, the root certificate 134 will be stored locally on the switch 112 such that the switch 112 acts as the PKI trust anchor.

The switch 112 may initialize all hardware ports into an untrusted state 122, such as when no traffic is detected (e.g., link down state) or when a link up event is detected on a port 118 where an unknown or unauthorized NIC 116 (or other device) has connected to a port 118 of the switch 112. While in the untrusted state 122 (or any state), the switch 112 may apply default network policies to traffic received on the port 118, such as a default ACL 124. The default ACL 124 may essentially serve as a mechanism to "jail" NICs 116 until they have been authorized and/or authenticated. For instance, the default ACL 124 may only allow unauthorized NICs 116 to communicate with certain services or resources, such as allowing certain communications to be sent to foundation services 126. However, the default ACL 124 may prevent the unauthorized NIC 116 from communicating with other services or resources until the NIC 116 has become authorized.

As described herein, ACLs are sets of rules or configurations used by network devices, such as the switch 112, to control access to resources based on identity, network address, or other identifiers of devices. The ACLs may define allow rules, deny rules, and/or any combination thereof.

The switch 112 may allow the NIC 116 to send service discovery messages, or various advertisement messages, under the default ACL 124. For instance, the NIC 116 may utilize UDP, DHCP, LLDP, or other network protocols to send advertisement packets that announce the NIC 116 being introduced into the data center fabric 120. The advertisement packets may be sent to the PKI service 126A in the data center fabric 120, and the NIC 116 and PKI service 126A may perform techniques to authenticate the NIC 116. For example, the NIC 116 may perform a security handshake or attestation handshake 128, such as a TLS handshake or a custom challenge, with the PKI service 126A. The PKI service 126A may use the attestation handshake 128 as a mechanism to attest to the NIC 116, and verify the identity and trustworthiness of the NIC 116. Various types of attestation handshakes 128 may be utilized according to the techniques described herein in order to establish trust by the NIC 116. In response to successfully verifying the NIC 116, the PKI service 126A may provide a digital certificate, such as a public identity certificate 130, that indicates an authenticated identity of the NIC 116 and validates to the root chain of the root certificate 134 stored on the switch 112.

The PKI service 126A may create and use intermediate certificates signed by the root certificate 134. Intermediate certificates form a chain of trust between the root certificate 134 and end-entity certificates (e.g., identity certificate 130 for the NIC 116 or other device, user certificates, server certificates, etc.). Intermediate certificates can be used to delegate certificate issuance and management responsibilities within the PKI hierarchy.

In some examples, the PKI service 126A may insert certificate metadata into the identity certificate 130 (also referred to herein as "digital certificate"), such as the IP addresses that the NIC is allowed to claim and use, the MAC address that is authorized for the NIC and the connected port. The certificate metadata may include, for instance, a series of port-IP-address entries or other attributes of the interfaces associated with the NIC 116 (e.g., interface name, IP address of the interface, MAC address of the interface, floating IP addresses, etc.). Further, the certificate metadata may include indications of network policies that are to be applied for the NIC 116. For instance, the identity certificate 130 may include a network policy label that indicates which network policies, such as which ACLs, should be applied for the NIC 116.

Once the NIC 116 receives the identity certificate 130, the NIC 116 may provide the identity certificate 130 to the switch 112. The NIC 116 and switch 112 may utilize various protocols in order to exchange the identity certificate 130. Generally, however, the NIC 116 and switch 112 may establish a cryptographic connection, such as a TLS or Datagram TLS (DTLS) connection, using the identity certificate 130. As an example, the switch 112 may use a TLS handshake, or another cryptographic protocol, designed to establish secure communication over the network. As part of the TLS handshake, the NIC 116 needs to provide its identity to the switch 112, and to prove its identity is needs to send the identity certificate 130 to the switch 112. The switch 112 may periodically or continuously poll the NIC 116, and the NIC 116 may run a Constrained Application Protocol (CoAP) server that supports TLS natively. The switch 112 may poll, such as by using CoAP calls, the NIC 116 (or server 114) for the identity certificate 130, and the CoAP server (NIC 116 and/or server 114) sends the identity certificate 130 to establish trust. Once the identity certificate 130 is obtained at the switch 112, the switch may stop polling. In some examples, the TLS handshake is a limited handshake that terminates once the identity certificate 130 from the server 114 and/or NIC 116 is received. In such examples, a symmetric key may not be utilized for further encryption.

The NIC 116 may send its identity certificate 130 to the switch 112 in an LLDP message that includes a Type-Length-Value (TLV) field, such as an identity TLV field, in which the identity certificate is contained as data. The switch 112 may receive the message from the NIC 116, and use the root certificate to verify a certificate chain of the identity certificate 130 as belonging to the root certificate. Once the identity certificate 130 has been verified, the switch 112 may extract the metadata in order to determine or construct network policies for the NIC 116. In some examples, the switch 112 may use the network policy label stored in the identity TLV to identify network policies, such as ACLs, that are stored locally on the switch 112. The identified network policies may then be applied on the port 118 to which the NIC 116 is connected. The switch 112 may extract the IP addresses and MAC address from the identity TLV to construct one or more constructed ACLs 138 and/or other network policies. For instance, certain traffic may be allowed for the IP addresses and MAC address that are bound to the port 118 and the NIC 116 is allowed to use. The switch 112 may send back a message to the NIC 116 that indicates that the NIC 116 has been authenticated using the identity certificate 130 (or not authenticated if the verification of the identity certificate fails). The switch 112 may send back an LLDP message that includes an authentication status TLV that conveys the authentication status of the port 118. In examples where the identity exchange succeeded, the authentication status TLV will carry the port status as "Trusted," and otherwise, the port status will remain "Untrusted." In some examples, this message (e.g., PDU) can be used to detect a "heartbeat" of the NIC 116 by determining that the NIC 116 is still connected and responsive, and/or to collect telemetry data.

The NICs 116 may not have any certificates in their persistent store, so when NICs 116 are provisioned for the first time, the PKI service 126A may provide identities to the NICs 116 before they are able to establish trust with the switches 112. However, once a NIC 116 is certified, the identity certificates 130 may be valid for a period of time (e.g., 90 days, 120 days, etc.), and subsequent identity exchanges with the switch 112 may occur without involvement of the PKI service 126A.

Once the port 118 for the NIC 116 is in the trusted state 136, the NIC 116 may be used by the server 114 and hosts running thereon to communicate with non-foundation resources 140 that are in the data center fabric 120, and outside the data center fabric 120 but within the service provider network 102. Additionally, or alternatively, the constructed ACLs 138 may allow the NIC 116 to communicate to external networks 142, such as the Internet.

Users 106 may create user accounts with the service provider to utilize the resources and services of the service provider network 102. The users 106 may utilize their user devices 108 to communicate over the external network(s) 142 (e.g., WANs, PANs, LANs, etc.) with the service provider network 102. The user devices 108 may comprise any type of computing device configured to communicate over the external network(s) 142, such as mobile phones, tablets, laptop computers, desktop computers, televisions, servers, and/or any other type of computing device. The users 106 may desire that the service provider network 102 host or support workloads in the data centers 104 that are managed by the service provider. Accordingly, the users 106 may, via their user account, request that a workload be launched on their behalf, and provide input data via one or more user portals (e.g., web console, command line interface (CLI), application programming interface (API), etc.). As described herein, a workload may generally include a designated collection or grouping of computing resources (e.g., compute, memory, storage, networking, etc.) in a computing-resource network, and the code or logic that performs functionality using the computing resources. The service provider network 102 may support a wide variety of workloads, such as web servers, databases, customer-facing applications, distributed data stores, batch processing, machine/deep learning training and/or inference, online gaming, video encoding, memory caching, and/or any other type of workload that can be supported by computing resources of a computing-resource network.

Generally, the service provider network 102, and components thereof, may comprise software, firmware, and/or other logic that is supported one computing device, or across more computing devices in the service provider network 102. Additionally, the service provider network 102 may comprise a system of other devices, such as software agents stored locally on virtual resources.

Figure 2:
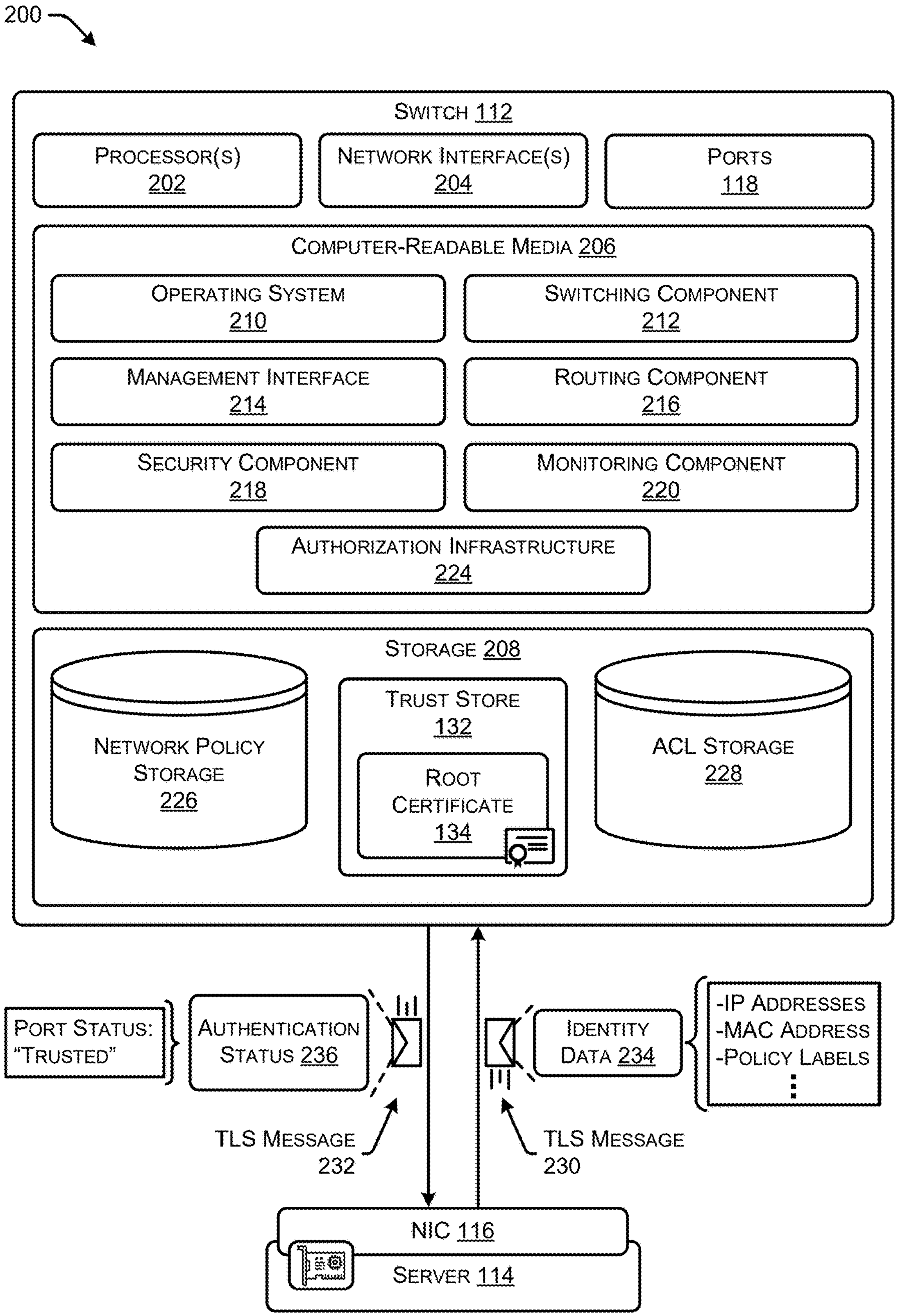
FIG. 2 illustrates a component diagram of a switch configured to perform techniques described herein.

FIG. 2 illustrates a component diagram 200 of a switch 112 configured to perform techniques described herein.

As illustrated, the switch 112 may include one or more hardware processors 202 (processors), or one or more devices, configured to execute one or more stored instructions. The processor(s) 202 may comprise one or more cores and may be responsible for executing instructions and processing data to perform various tasks. The processor(s) 202 may comprise arithmetic logic units, control units, and registers, enabling it to carry out complex operations swiftly and efficiently. Further, the service provider network 102 may include one or more network interfaces 204 configured to provide communications between the service provider network 102 and other devices, such as the servers 114 and/or other systems or devices in the service provider network 102 and/or remote from the service provider network 102. The network interfaces 204 may include devices configured to couple to personal area networks (PANs), wired and wireless local area networks (LANs), wired and wireless wide area networks (WANs), and so forth. The network interfaces 204 may include hardware components, such as Ethernet ports, wireless transceivers, or modem interfaces, and software protocols that manage data transmission. The network interfaces 204 can support various communication standards, including Ethernet, Wi-Fi, Bluetooth, and cellular technologies, allowing for versatile connectivity options. Advanced The network interfaces 204 may incorporate features like Quality of Service (QoS) prioritization, security protocols, and energy-efficient operation.

The service provider network 102 may also include computer-readable media 206, also referred to as memory, that stores various executable components (e.g., software-based components, firmware-based components, etc.). In addition to various components discussed in FIG. 1, the computer-readable media 206 may further store components to implement functionality described herein. By way of example, and not limitation, memory may be computer-readable media 206 and can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The computer-readable media 206 may store an operating system 210 utilized to control the operation of the switch 112. According to one embodiment, the operating system 210 comprises the LINUX operating system. According to another embodiment, the operating system(s) comprise the WINDOWS SERVER operating system from MICROSOFT Corporation of Redmond, Washington. According to further embodiments, the operating system(s) can comprise the UNIX operating system or one of its variants. It should be appreciated that other operating systems can also be utilized. In some instances, the operating system 210 may be specialized and designed to manage network traffic, control switch hardware, and provide various networking features. The operating system 210 may perform switch operating systems using proprietary systems developed by switch vendors or open-source solutions.

The computer-readable media 206 may store and execute a switching component 212 that is configured to control the forwarding of data packets between network ports. The switching component 212 implements switching algorithms such as store-and-forward or cut-through switching, manages MAC address tables, VLANs, and port configurations, and enforces quality of service (QoS) policies to prioritize traffic. The computer-readable media 206 may store and execute a management interface 214 that is configured to allows administrators or operators to configure, monitor, and manage the switch 112 remotely. This management interface 214 can be accessed via a command-line interface (CLI), web-based graphical user interface (GUI), or through management protocols such as SNMP (Simple Network Management Protocol).

The computer-readable media 206 may store and execute a routing component 216, particularly for L3 switches, that has routing capabilities and software components to support dynamic routing protocols such as OSPF (Open Shortest Path First) or BGP (Border Gateway Protocol). These protocols enable the switch 112 to make routing decisions and forward traffic between different subnets or VLANs. The computer-readable media 206 may store and execute a security component 218 that includes or performs security features to protect the network from unauthorized access, attacks, and threats. This may include features such as ACLs, port security, MAC address filtering, and authentication mechanisms such as 802.1X. The computer-readable media 206 may store and execute a monitoring component 220 which may include monitoring and diagnostics tools to help administrators troubleshoot network issues, monitor the switch 112 performance, and analyze traffic patterns. The monitoring component 220 may be able to perform features such as port mirroring, traffic monitoring, and logging capabilities.

Additionally, the switch 112 may include a storage 208 which may comprise hard disk drives (HDDs), solid-state drives (SSDs), cache memory, and non-volatile memory (e.g., flash memory). The storage 208 may comprise various storage mediums offer varying capacities, data transfer rates, and durability characteristics. In some instances, the storage 208 may enable the retention of user data, system configurations, and installed applications even when the switch 112 is powered off. The storage 208 may include network policy storage 226 that includes network policies that are to be applied to devices communicating on ports 118 of the switches 112, such as QoS policies to prioritize critical traffic, as well as any type of traffic limiter policies (e.g., rate limiter policies, traffic shaping policies, traffic policers, etc.). The ACL storage 228 may store various ACL policies, such as default ACLs 124 and constructed ACLs 138.

As shown, the NIC 116 may send a TLS message 230 to the switch 112 that includes identity data 234 in which the identity certificate 130 is contained as data. The switch 112 may receive the TLS message 230 from the NIC 116, and use the root certificate 134 data to verify a certificate chain of the identity certificate 130 as belonging to the root certificate 134. Once the identity certificate 130 has been verified, the switch 112 may extract the metadata from the identity data 234 in order to determine or construct network policies for the NIC 116.

In some examples, the switch 112 may use the network policy label stored in the identity data 234 to identify network policies, such as ACLs, that are stored locally on the switch 112. The identified network policies may then be applied on the port 118 to which the NIC 116 is connected. The switch 112 may extract the IP addresses and MAC address from the identity data 234 to construct one or more constructed ACLs 138 and/or other network policies. For instance, certain traffic may be allowed for the IP addresses and MAC address that are bound to the port 118 and the NIC 116 is allowed to use. The switch 112 may send back a message to the NIC 116 that indicates that the NIC 116 has been authenticated using the identity certificate 130 (or not authenticated if the verification of the identity certificate fails). For example, the switch 112 may send back an LLDP message 232 that includes an authentication status 236 that conveys the authentication status of the port 118. In examples where the identity exchange succeeded, the authentication status 236 will carry the port status as "Trusted," and otherwise, the port status will remain "Untrusted."

Figure 3:
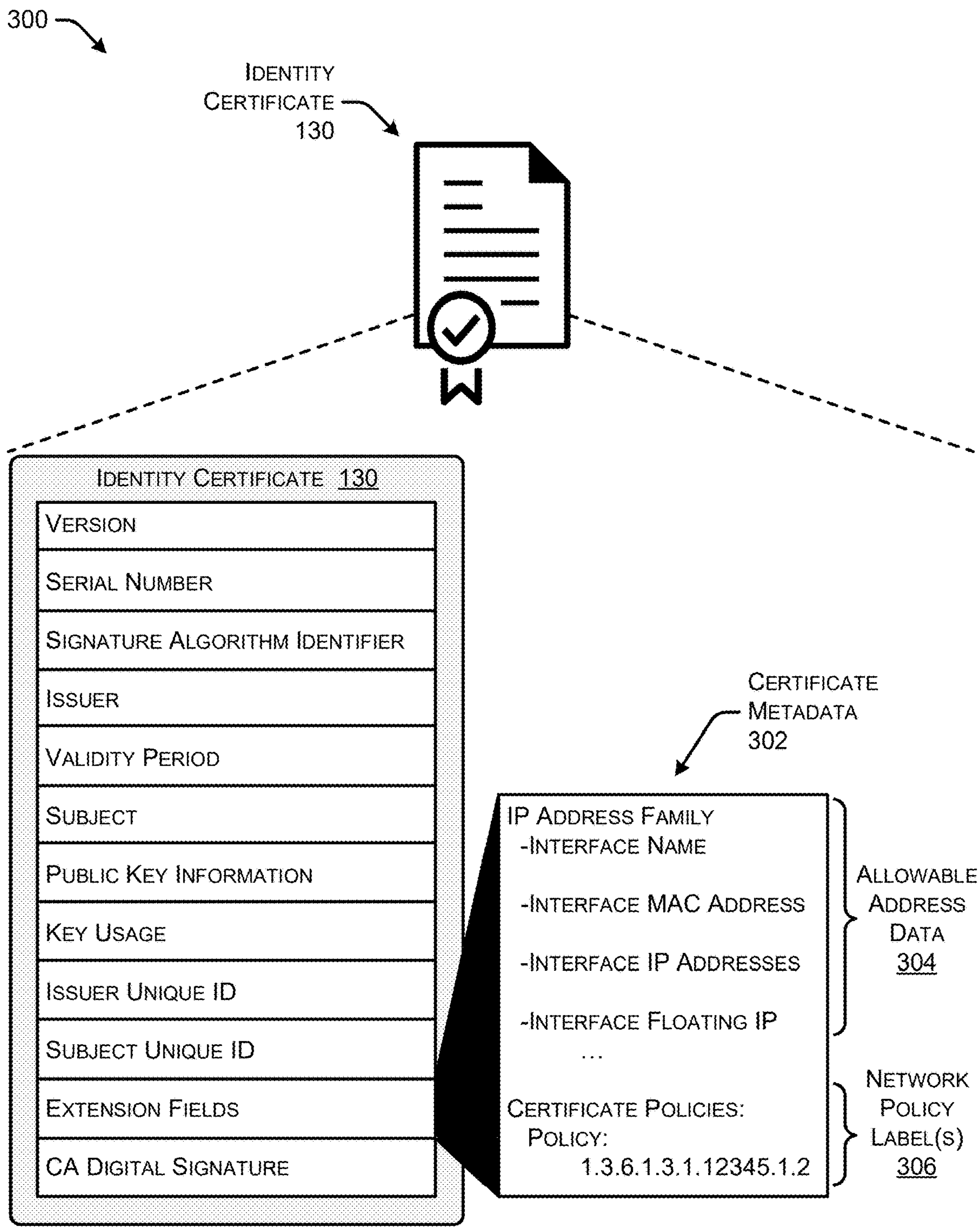
FIG. 3 illustrates an example of an identity certificate that a PKI service provides to a NIC after successful completion of an attestation handshake and that is usable to authenticate with a switch.

FIG. 3 illustrates an example of an identity certificate 130 that a PKI service 126A provides to a NIC 116 after successful completion of an attestation handshake 128 and that is usable to authenticate with a switch 112.

Generally, the identity certificate 130 may be a PKI digital certificate and contain various pieces of information that identify and authenticate the NIC 116 (or other end device) and provide details about the certificate itself. The exact contents of an identity certificate 130 may vary depending on the certificate format and the specific standards or protocols used (e.g., X.509, PKCS #7). In the illustrated example, the identity certificate 130 includes the version number of the certificate format being used (e.g., X.509v1, X.509v3), the serial number or a unique identifier assigned by the issuing Certificate Authority (CA) to distinguish the certificate from others issued by the same CA, the issuer name or the distinguished name (DN) or identifier of the CA that issued the certificate, the validity period during which the identity certificate 130 is considered valid (including the start date and end date of the certificate's validity), the subject or DN or identifier of the entity (such as an organization, server, or individual) to which the certificate is issued (e.g., the entity that the certificate is intended to represent, such as the NIC 116), public key of the certificate holder (which is used for encryption, digital signatures, or key exchange in secure communication protocols (e.g., TLS/SSL)), the key usage that specifies the cryptographic operations (e.g., digital signature, key encipherment) for which the public key can be used, an optional issuer unique identifier field containing a unique identifier assigned by the CA to the certificate issuer, and an optional subject unique identifier field containing a unique identifier assigned by the CA to the certificate subject.

In some examples, the identity certificate 130 may include one or more extension fields that may be used to store certificate metadata 302. Generally, the certificate metadata 302 may be used to provide the NIC 116 with IP addresses in the identity certificates 130. The certificate metadata 302 may be embed in the extension fields according to various encoding plans, such as a TLV format. The IP address may be input using IP Address Extensions, such as an IPAddressFamily type that is a sequence containing an addressFamily and ipAddressChoice element. As shown, an IP address family extension may be utilized to indicate allowable address data 304, such as the interface name, interface MAC address, interface IP addresses, interface floating IP addresses, and so forth. The allowable address data may include a series of port-IP address entries that indicate network attributes of the interfaces of the NICs 116. The addresses listed in the allowable address data 304 may be addresses that may be claimed and used by the holder of the certificate, such as the NIC 116. Further, the extension fields may include a certificate policies field that include one or more network policy labels 306 that are to be used to identify network policies to apply to a port 118 of the switch 112 to which the NIC 116 is connected. The network policy labels(s) 306 may be used to identify locally stored policies (e.g., ACLs, QoS policies, etc.) on the switch 112 that are applied on the port 118.

These elements (and/or additional or different elements) generally form the contents of the identity certificate 130 and enable secure authentication, encryption, and communication between the NIC 116 and the switch 112. The NIC 116 is able to present the identity certificate 130 to the switch 112 to establish their identity and prove the integrity and authenticity of their public key during secure communication or cryptographic operations.

Figure 4:
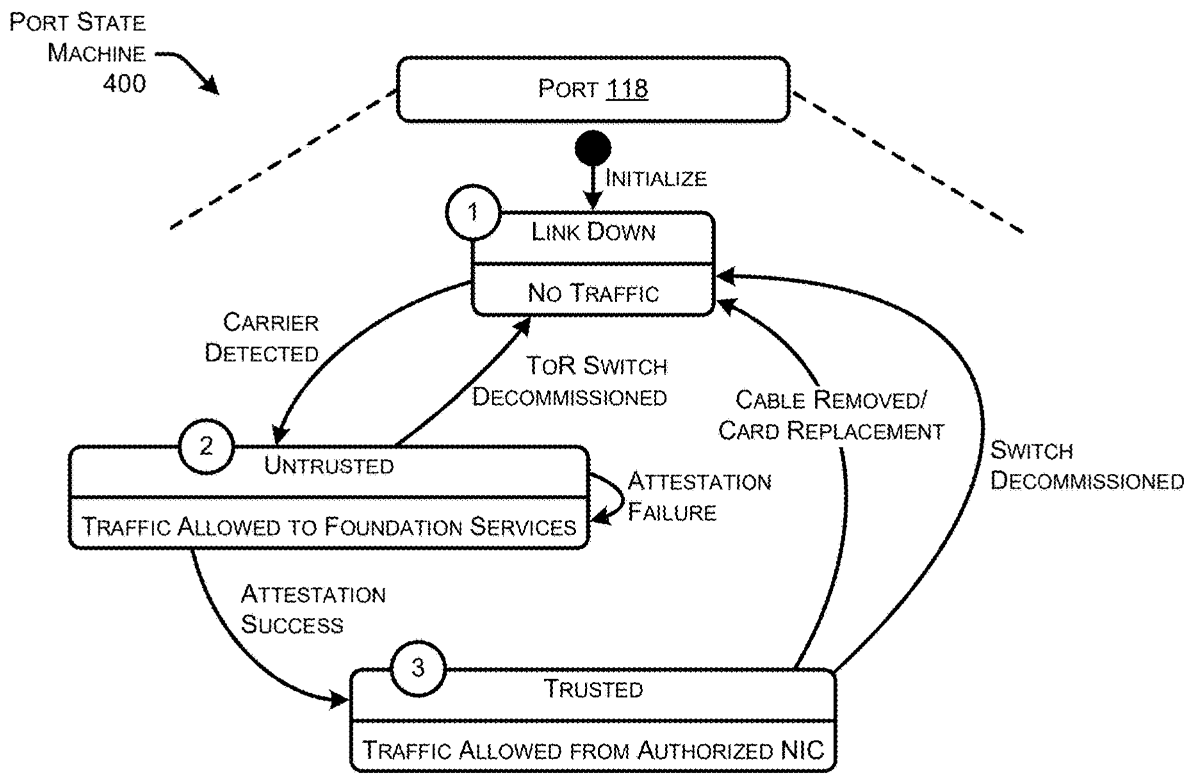
FIG. 4 illustrates an example port state machine that illustrates operational states and transitions of a port of a switch.

FIG. 4 illustrates an example port state machine 400 that illustrates operational states and transitions of a port 118 of a switch 112.

FIG. 4 illustrates a port state machine 400 that represents how the switch 112 may initialize all hardware ports into an initial link down state where no traffic is detected. In this state, the switch 112 may poll to determine if a carrier has been detected on a port 118. In response to detecting a carrier (e.g., link up event on the port 118), the switch 112 may then transition into an untrusted state 122 where an unknown or unauthorized NIC 116 (or other device) has connected to a port 118 of the switch 112. While in the untrusted state 122, the switch 112 may simply default network policies to traffic received on the port, such as a default ACL 124. The default ACL 124 may essentially serve as a mechanism to "jail" the NICs 116 until they have been authorized and/or authenticated. For instance, the default ACL 124 may only allow unauthorized NICs 116 to communicate with certain services or resources, such as allowing certain communications to be sent to foundation services 126. However, the default ACL 124 may prevent the unauthorized NIC 116 from communicating with other services or resources until the NIC 116 has become authorized.

The switch 112 may cause the port 118 to stay in the untrusted state 122 in response to attestation failure by the NIC 116, or the NIC 116 otherwise not authenticating with the switch 112. However, in response to an attestation success with the NIC 116, the switch 112 may transition the port into a trusted state 136 where the NIC 116 may be used by the server 114 and hosts running thereon to communicate with non-foundation resources 140 that are in the data center fabric 120, and outside the data center fabric 120 but within the service provider network 102. The constructed ACLs 138 may allow the NIC 116 to communicate to external networks 142, such as the Internet.

In the trusted state 136, the switch 112 may continue to poll the port 118 to determine if a cable was removed from the port 118, or if a NIC 116 was removed or replaced. In such examples, the switch 112 may transition the port 118 back into the link down state where no traffic is detected, and the switch 112 may close the port 118 to traffic, or apply the default ACL 124. The switch 112 may be decommissioned, and in such examples, the switch 112 may transition the ports 118 back into the link down state.

Figure 5:
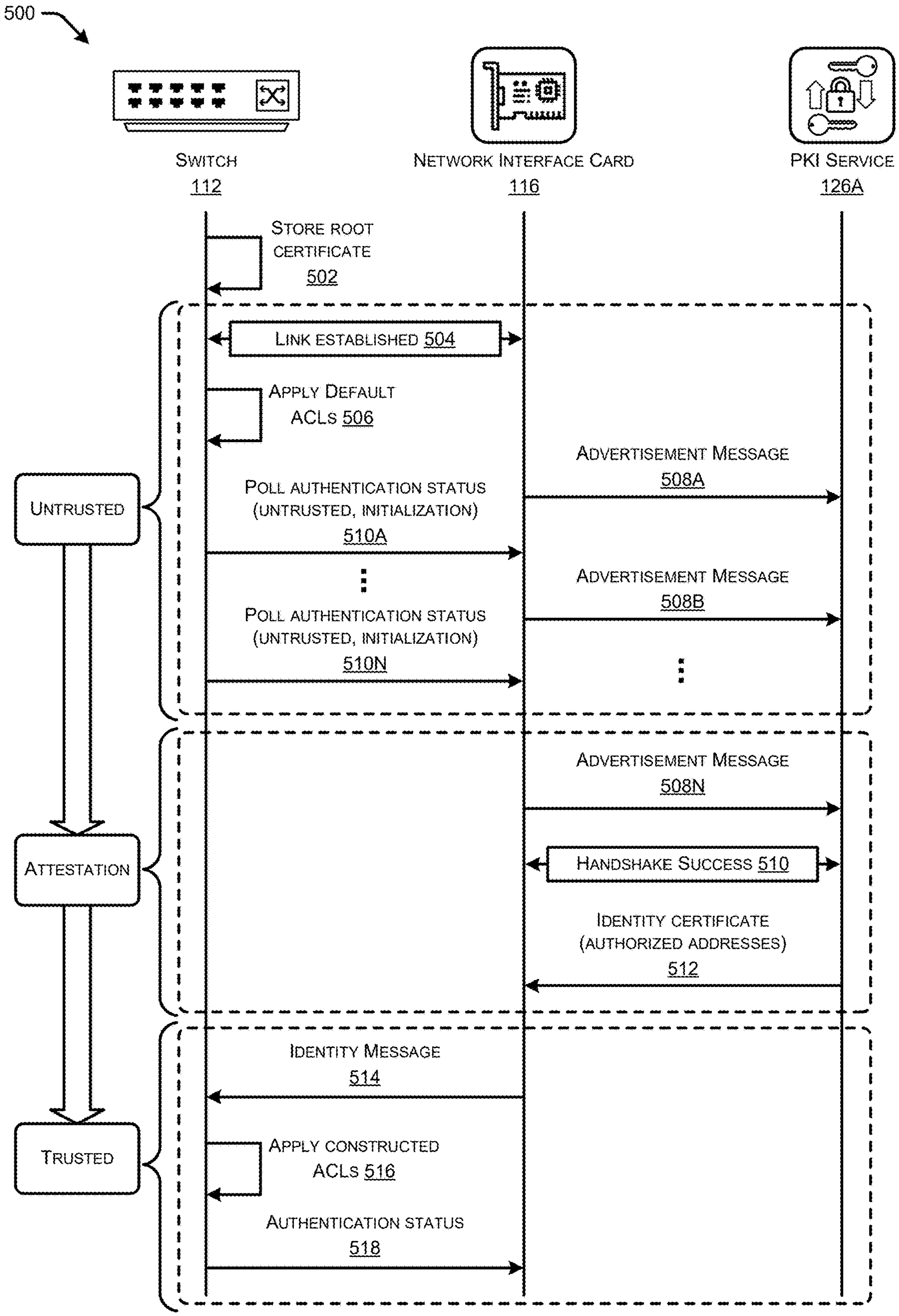
FIG. 5 illustrates a sequence diagram of an example method for a switch to authenticate a NIC using an identity certificate provided to the NIC by a PKI service and a root certificate stored locally on the switch.

FIG. 5 illustrates a sequence diagram of an example method 500 for a switch 112 to authenticate a NIC 116 using an identity certificate 130 provided to the NIC 116 by a PKI service 126A and a root certificate 134 stored locally on the switch 112.

At 502, the switch 112 may store a root certificate 134 in a trust store 132. The root certificate 134 may be published to the switch 112 as part of software packages and provided to the switch 112 using a secure update or upgrade. The switch 112 may store the root certificate 134 in a secure persistent storage area (or "pstore"), such as being cached in a pstore.

In an untrusted phase, at 504, the switch 112 may establish a link with the NIC 116, such as by detecting a link up on a port 118 and establishing an L2 communication link (e.g., LLDP). At 506, the switch 112 may apply default ACLs 124 on the port 118 as the port 118 is in an untrusted state 122. The NIC 116 may send one or more advertisement messages 508A-508N to foundation services 126, such as the PKI service 126A, to advertise the NIC 116 coming onto the network. The switch 112 may continue to poll 510A-510N the authentication state of the NIC 116 on the port 118, while maintaining the port 118 in the untrusted state 122. The polling steps 510 may be TLS handshake requests that are either not responded to, or that otherwise fail.

In an attestation phase, at 510, the NIC 116 may successfully complete a security handshake with the PKI service 126A. At 512, the identity certificate 130 may be provided to the NIC 116 where the identity certificate 130 includes authorized or allowable addresses 304 for the NIC 116 to claim and use. In some instances, the identity certificate 130 may be provided using TLS over CoAP (e.g., a CoAP call according to the TLS protocol).

In a trusted phase, at 514, the NIC 116 may send an identity message that includes identity data 234. The identity message may be a CoAP call sent according to a TLS handshake protocol. The identity data 234 may include data from the identity certificate 130, or at least portions of data in the identity certificate 130, including the allowable address data 304 and/or the network policy label(s) 306. At 516, the switch 112, may construct and apply one or more constructed ACLs 138 to the port 118 to allow traffic to non-foundation resources 140 and services, and/or external network(s) 142. At 518, the switch 112 may send back an LLDP message 232 that includes an authentication status TLV 236 that indicates a port status of the port 118, in this case, trusted.

Figure 6A:
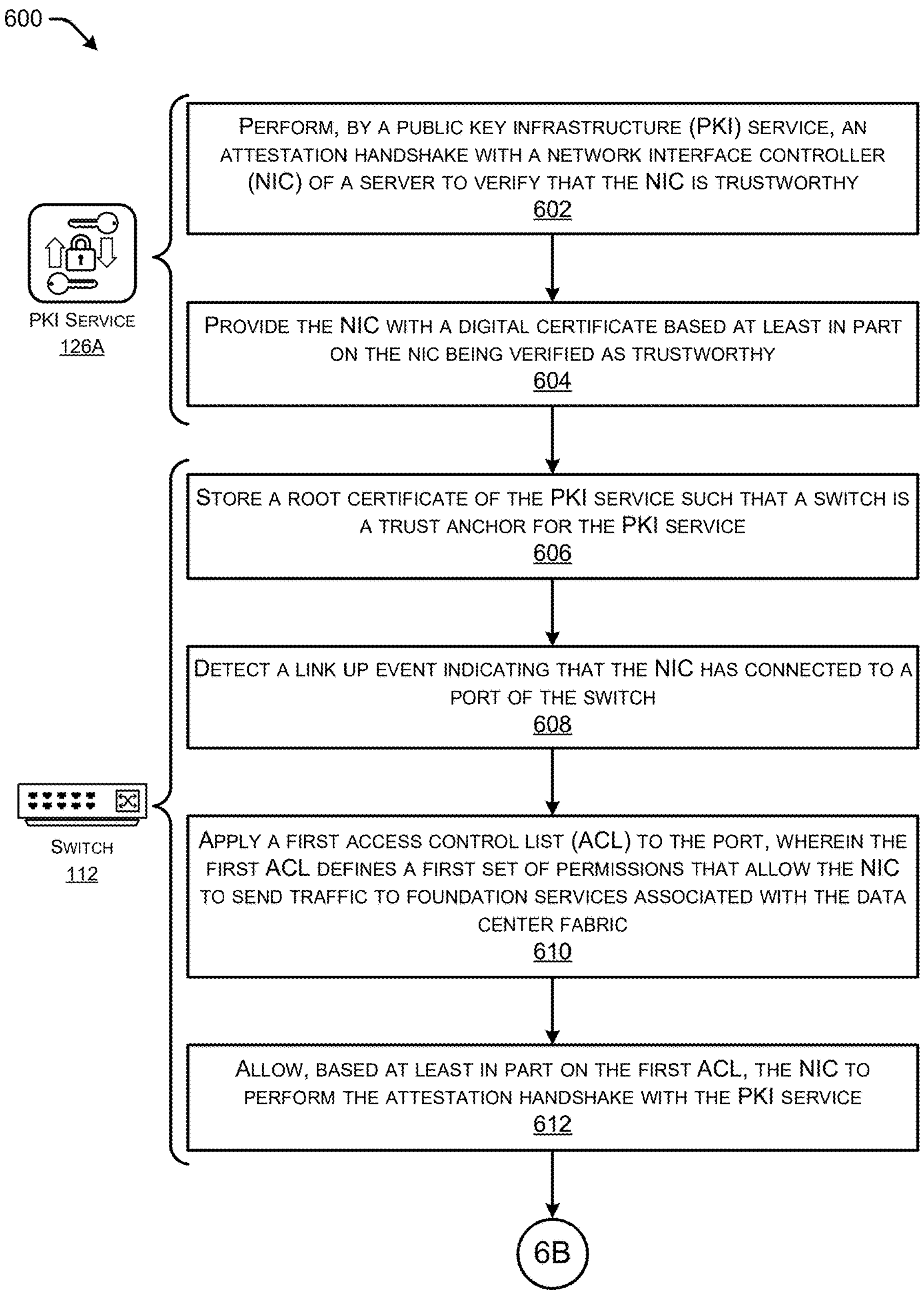
FIGS. 6A and 6B collectively illustrate a flow diagram of an example method for a switch to authenticate a NIC using an identity certificate provided to the NIC by a PKI service and a root certificate stored locally on the switch.
Figure 6B:
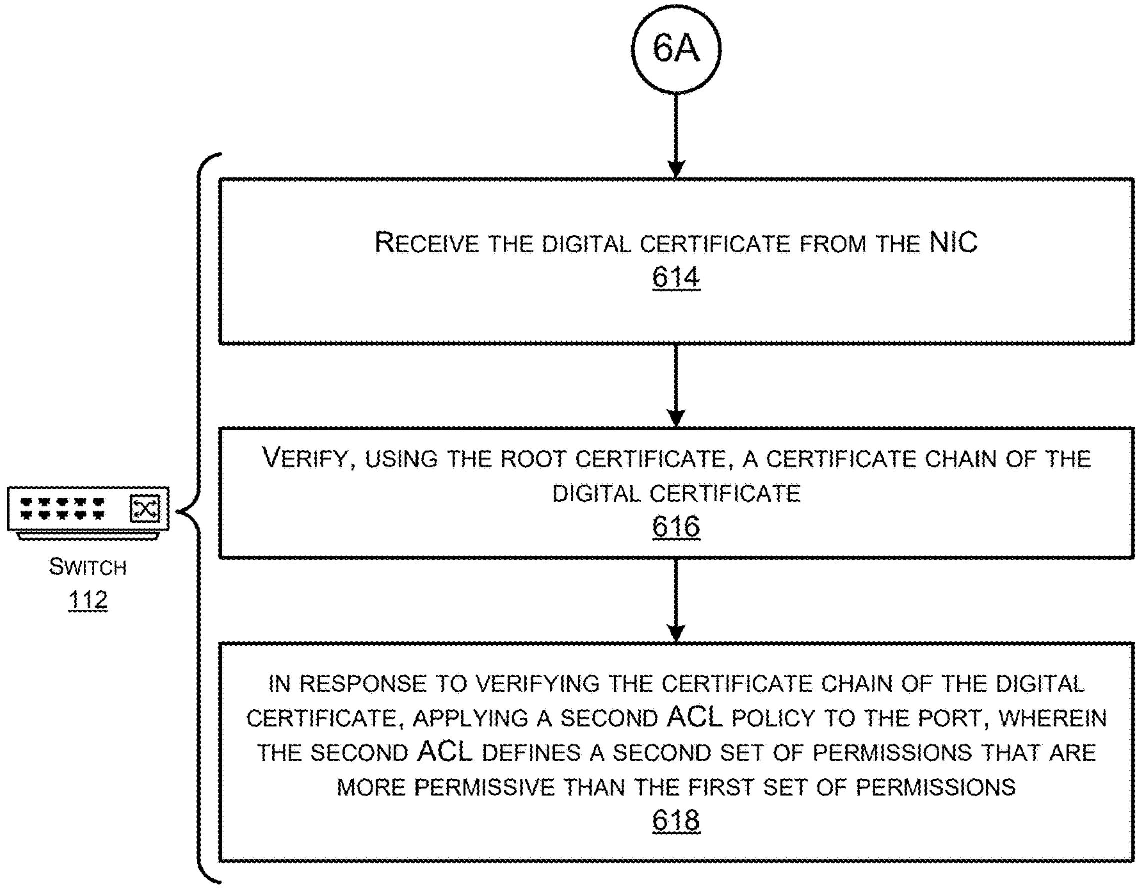
Figure 7:
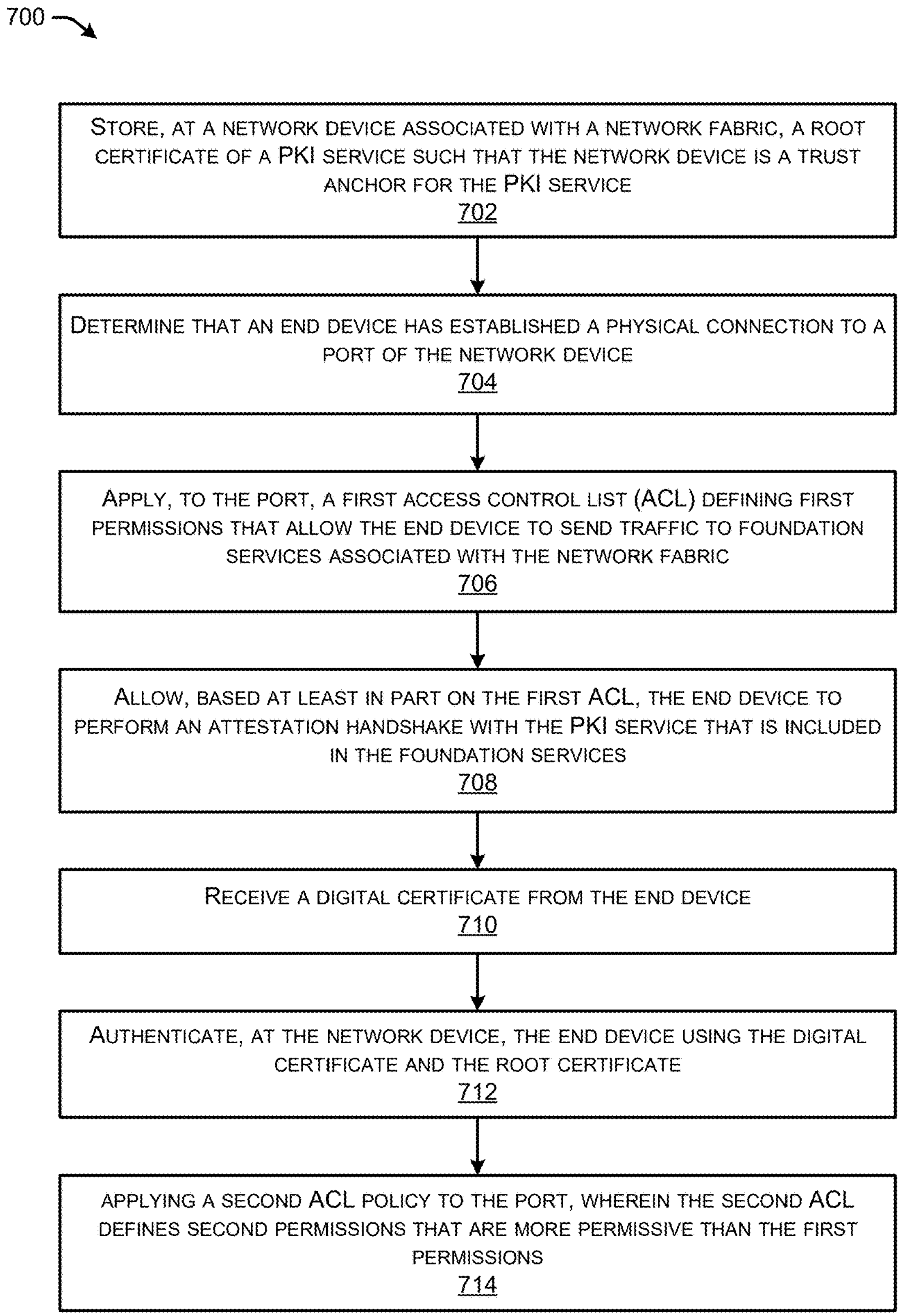
FIG. 7 illustrates a flow diagram of an example method for a switch to authenticate a NIC using an identity certificate provided to the NIC and a root certificate stored locally on the switch.

FIGS. 6A, 6B, and 7 illustrate flow diagrams of example methods 600 and 700 that illustrate aspects of the functions performed at least partly by the devices or components in the service provider network 102 as described in this disclosure (e.g., switch 112, NIC 116, PKI service 126A, etc.). The logical operations described herein with respect to FIGS. 6A, 6B, and 7 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 6A, 6B, and 7 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

FIGS. 6A and 6B collectively illustrate a flow diagram of an example method 600 for a switch 112 to authenticate a NIC 116 using an identity certificate 130 provided to the NIC 116 by a PKI service 126A and a root certificate 134 stored locally on the switch 112. In some examples, the techniques of method 600 may be performed by a system of devices associated with a data center fabric 120, such as a ToR switch (e.g., switch 112) that authenticates a NIC 16 of a server 114 The system may include a PKI service 126A configured to perform first operations, and a NIC 116 configured to perform second operations.

At 602, the PKI service 126A may perform an attestation handshake 128 with the NIC 116 of the server 114 to verify that the NIC 116 is trustworthy. The attestation handshake 128 may be a TLS handshake or a custom challenge performed with the PKI service 126A. The PKI service 126A may use the attestation handshake 128 as a mechanism to attest to the NIC 116, and verify the identity and trustworthiness of the NIC 116. Various types of attestation handshakes 128 may be utilized according to the techniques described herein in order to establish trust by the NIC 116.

At 604, the PKI service 126A may provide the NIC 116 with a digital certificate 130 based at least in part on the NIC 116 being verified as trustworthy. For instance, in response to successfully verifying the NIC 116, the PKI service 126A may provide a digital certificate, such as a public identity certificate 130, that indicates an authenticated identity of the NIC 116 and validates to the root chain of the root certificate 134 stored on the switch 112.

At 606, the ToR switch 112 may store a root certificate 134 of the PKI service 126A such that the ToR switch 112 is a trust anchor for the PKI service 126. In some instances, the root certificate 134 may be published to the switch 112 as part of software packages and provided using a secure update or upgrade. The switch 112 may store the root certificate 134 in a secure persistent storage area (or "pstore"), such as being cached in the pstore. However, the root certificate 134 (or certificates) may be stored in other secure storage locations, such as a TPM, secure enclave, or TEEs.

At 608, the ToR switch 112 may detect a link up event indicating that the NIC 116 has connected to a port 118 of the ToR switch 112. The link up event may refer to the event where a physical connection (link) is established between the port 118 of the switch 112 and the NIC 116. The link up event may occur when the NIC 116 has powered on and successfully established communication with the switch 112.

At 610, the ToR switch 112 may apply a first access control list (ACL) to the port. In some instances, the first ACL list may be a default ACL 124 that defines a first set of permissions that allow the NIC 116 to send traffic to foundation services 126 associated with the data center fabric 120. In some examples, the default ACL may always be applied to ports and always in effect such that all devices connects to the ports 118 are able to communicate with the foundation services 126.

At 612, the ToR switch 112 may allow, based at least in part on the first ACL, the NIC 116 to perform the attestation handshake with the PKI service 126A. For instance, the port 118 may be in an in an untrusted state 122 where the default ACL 124 is applied to the port 118 that allows the attestation handshake 128 with the PKI service 126A.

At 614, the ToR switch 112 may receive the digital certificate 130 from the NIC 116. For instance, the digital certificate 130 may be provided to the NIC 116 as part of a TLS handshake to authenticate, or provide its identity to the switch 112.

At 616, the ToR switch 112 may verify, using the root certificate 134, a certificate chain of the digital certificate 130. For instance, the ToR switch 112 may perform certificate chain validation, which involves checking the trustworthiness of the digital certificate 130 against a known and trusted root certificate 134 by working up the certificate chain until the trusted root certificate 134 is reached. The process may include the use of SSL/TLS/DTL connections and protocols.

At 618, the switch 112 may in response to verifying the certificate chain of the digital certificate 130, apply a second ACL policy to the port. Generally, the second ACL may define a second set of permissions that are more permissive than the first set of permissions of the default ACL 124. For instance, the second ACL may be a constructed ACL 138 that permits the NIC 116 to communicate with non-foundation resources 140 and/or external networks 142.

FIG. 7 illustrates a flow diagram of an example method 700 for a switch 112 to authenticate a NIC 116 using an identity certificate 130 provided to the NIC 116 and a root certificate 134 stored locally on the switch 112.

At 702, a network device (e.g., switch 112) may store, at a network device associated with a network fabric, a root certificate of a PKI service such that the network device is a trust anchor for the PKI service. The root certificate 134 may be published to the switch 112 as part of software packages and provided using a secure update or upgrade. The switch 112 may store the root certificate 134 in a secure persistent storage area (or "pstore"), such as being cached in the pstore. However, the root certificate 134 (or certificates) may be stored in other secure storage locations, such as a TPM, secure enclave, or TEEs.

At 704, the network device (e.g., switch 112) may determine that an end device (e.g., Nic 116, server 114, etc.) has established a physical connection to a port 118 of the network device. For instance, the switch 112 may detect a link up event indicating that the NIC 116 has connected to a port 118 of the ToR switch 112. The link up event may refer to the event where a physical connection (link) is established between the port 118 of the switch 112 and the NIC 116. The link up event may occur when the NIC 116 has powered on and successfully established communication with the switch 112.

At 706, the network device (e.g., switch 112) may apply, to the port 118, a first access control list (ACL) defining first permissions that allow the end device to send traffic to foundation services associated with the network fabric. In some instances, the first ACL list may be a default ACL 124 that defines a first set of permissions that allow the NIC 116 to send traffic to foundation services 126 associated with the data center fabric 120. In some examples, the default ACL may always be applied to ports and always in effect such that all devices connects to the ports 118 are able to communicate with the foundation services 126.

At 708, the network device (e.g., switch 112) may allow, based at least in part on the first ACL, the end device to perform an attestation handshake with the PKI service that is included in the foundation services. For instance, the port 118 may be in an in an untrusted state 122 where the default ACL 124 is applied to the port 118 that allows the attestation handshake 128 with the PKI service 126A.

At 710, the network device (e.g., switch 112) may receive a digital certificate from the end device. For instance, the digital certificate 130 may be provided to the NIC 116 as part of a TLS handshake to authenticate, or provide its identity to the switch 112.

At 712, the network device (e.g., switch 112) may authenticate, at the network device, the end device using the digital certificate and the root certificate. For instance, the switch 112 may perform certificate chain validation, which involves checking the trustworthiness of the digital certificate 130 against a known and trusted root certificate 134 by working up the certificate chain until the trusted root certificate 134 is reached. The process may include the use of SSL/TLS/DTL connections and protocols.

At 714, the switch 112 may, in response to authenticating the end device, apply a second ACL policy to the port, wherein the second ACL defines second permissions that are more permissive than the first permissions. Generally, the second ACL may define a second set of permissions that are more permissive than the first set of permissions of the default ACL 124. For instance, the second ACL may be a constructed ACL 138 that permits the NIC 116 to communicate with non-foundation resources 140 and/or external networks 142.

Figure 8:
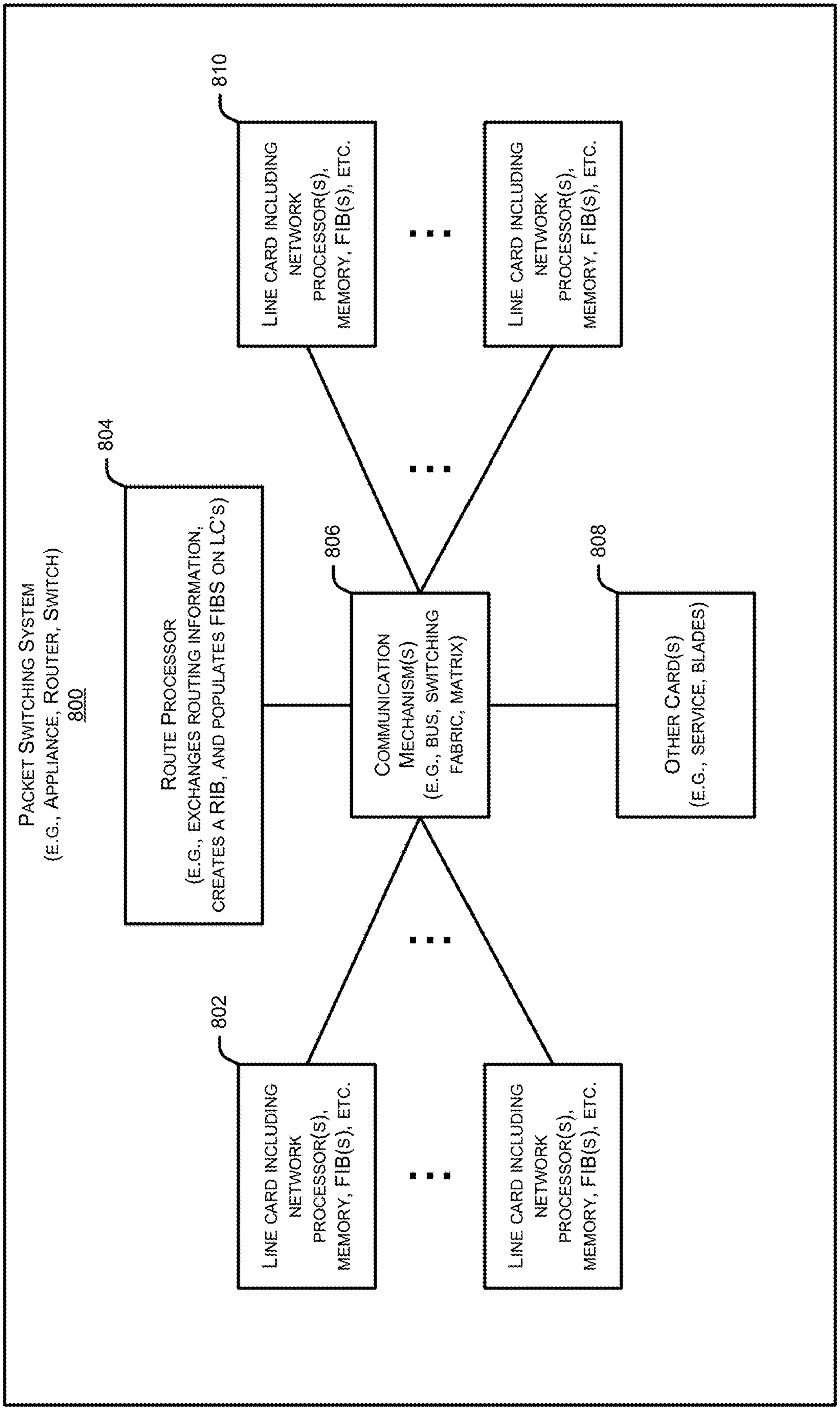
FIG. 8 illustrates a block diagram illustrating an example packet switching system that can be utilized to implement various aspects of the technologies disclosed herein.

FIG. 8 illustrates a block diagram illustrating an example packet switching device (or system) 800 that can be utilized to implement various aspects of the technologies disclosed herein. In some examples, packet switching device(s) 800 may be employed in various networks, such as, as a switch 112 connected to data center fabric 120 as described with respect to FIG. 1.

In some examples, a packet switching device 800 may comprise multiple line card(s) 802, 810, each with one or more network interfaces for sending and receiving packets over communications links (e.g., possibly part of a link aggregation group). The packet switching device 800 may also have a control plane with one or more processing elements 804 for managing the control plane and/or control plane processing of packets associated with forwarding of packets in a network. The packet switching device 800 may also include other cards 808 (e.g., service cards, blades) which include processing elements that are used to process (e.g., forward/send, drop, manipulate, change, modify, receive, create, duplicate, apply a service) packets associated with forwarding of packets in a network. The packet switching device 800 may comprise hardware-based communication mechanism 806 (e.g., bus, switching fabric, and/or matrix, etc.) for allowing its different entities 802, 804, 808 and 810 to communicate. Line card(s) 802, 810 may typically perform the actions of being both an ingress and/or an egress line card 802, 810, in regard to multiple other particular packets and/or packet streams being received by, or sent from, packet switching device 800.

Figure 9:
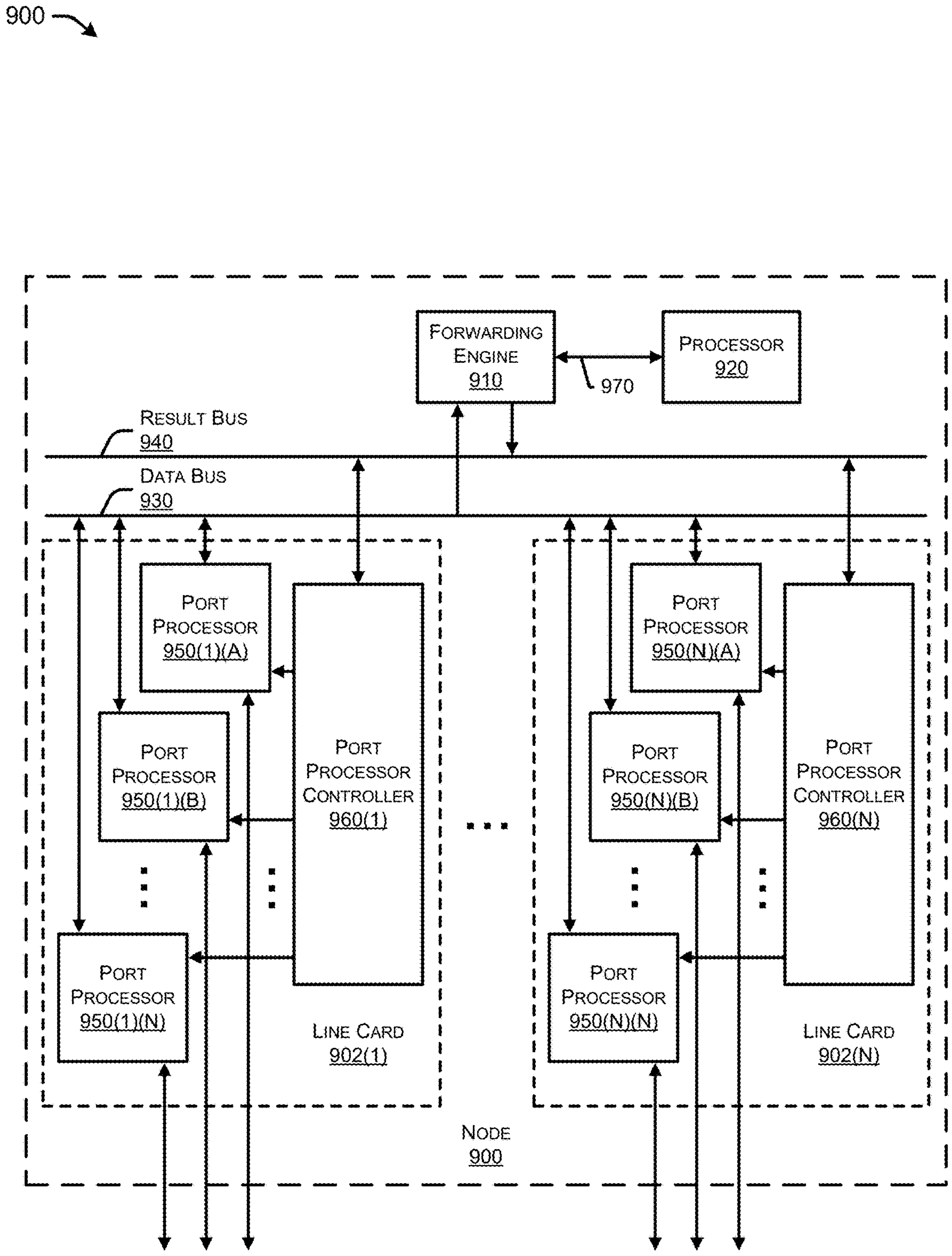
FIG. 9 illustrates a block diagram illustrating certain components of an example node that can be utilized to implement various aspects of the technologies disclosed herein.

FIG. 9 illustrates a block diagram illustrating certain components of an example node 900 that can be utilized to implement various aspects of the technologies disclosed herein. In some examples, node(s) 900 may be employed in various networks, such as a switch 112, connected to the data center fabric 120 as described with respect to FIG. 1.

In some examples, node 900 may include any number of line cards 902 (e.g., line cards 902(1)-(N), where N may be any integer greater than 1) that are communicatively coupled to a forwarding engine 910 (also referred to as a packet forwarder) and/or a processor 920 via a data bus 930 and/or a result bus 940. Line cards 902(1)-(N) may include any number of port processors 950(1)(A)-(N)(N) which are controlled by port processor controllers 960(1)-(N), where N may be any integer greater than 1. Additionally, or alternatively, forwarding engine 910 and/or processor 920 are not only coupled to one another via the data bus 930 and the result bus 940, but may also communicatively coupled to one another by a communications link 970.

The processors (e.g., the port processor(s) 950 and/or the port processor controller(s) 960) of each line card 902 may be mounted on a single printed circuit board. When a packet or packet and header are received, the packet or packet and header may be identified and analyzed by node 900 (also referred to herein as a router) in the following manner. Upon receipt, a packet (or some or all of its control information) or packet and header may be sent from one of port processor(s) 950(1)(A)-(N)(N) at which the packet or packet and header was received and to one or more of those devices coupled to the data bus 830 (e.g., others of the port processor(s) 950(1)(A)-(N)(N), the forwarding engine 910 and/or the processor 920). Handling of the packet or packet and header may be determined, for example, by the forwarding engine 910. For example, the forwarding engine 910 may determine that the packet or packet and header should be forwarded to one or more of port processors 950(1)(A)-(N)(N). This may be accomplished by indicating to corresponding one(s) of port processor controllers 960(1)-(N) that the copy of the packet or packet and header held in the given one(s) of port processor(s) 950(1)(A)-(N)(N) should be forwarded to the appropriate one of port processor(s) 950(1)(A)-(N)(N). Additionally, or alternatively, once a packet or packet and header has been identified for processing, the forwarding engine 910, the processor 920, and/or the like may be used to process the packet or packet and header in some manner and/or maty add packet security information in order to secure the packet. On a node 900 sourcing such a packet or packet and header, this processing may include, for example, encryption of some or all of the packets or packet and header's information, the addition of a digital signature, and/or some other information and/or processing capable of securing the packet or packet and header. On a node 900 receiving such a processed packet or packet and header, the corresponding process may be performed to recover or validate the packets or packet and header's information that has been secured.

Figure 10:
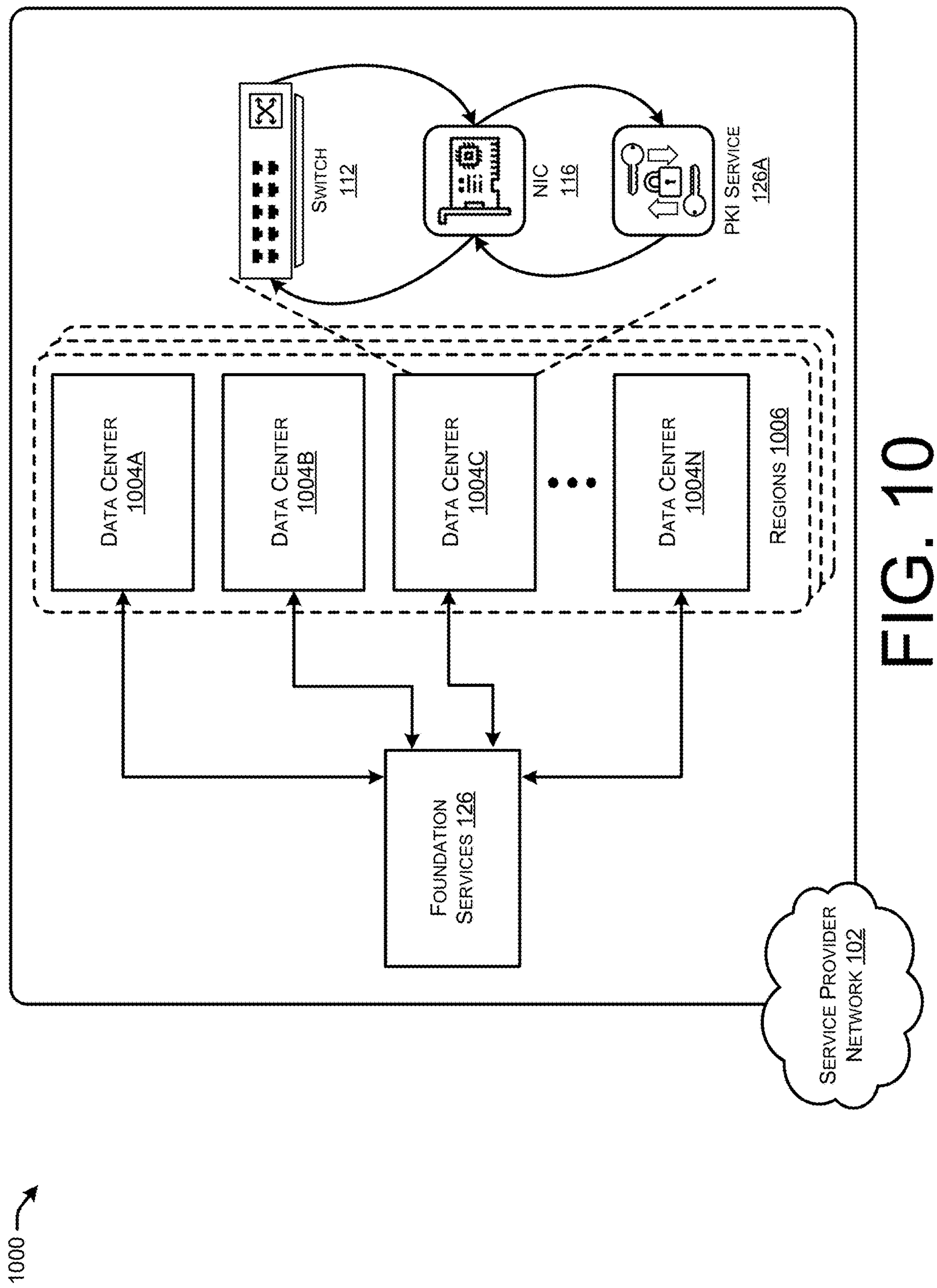
FIG. 10 is a system and network diagram that shows an illustrative operating environment that includes data centers of a service provider network that can be configured to implement aspects of the functionality described herein.

FIG. 10 is a system and network diagram 1000 that shows an illustrative operating environment that includes data centers 1004 in one or more regions 1006 of a service provider network 102 that can be configured to implement aspects of the functionality described herein. The service provider network 102 can provide computing resources, like VM instances and storage, on a permanent or an as-needed basis. Among other types of functionality, the computing resources provided by the service provider network 102 may be utilized to implement the various services described above. As also discussed above, the computing resources provided by the service provider network 102 can include various types of computing resources, such as data processing resources like VM instances, data storage resources, networking resources, data communication resources, network services, and the like.

Each type of computing resource provided by the service provider network 102 can be general-purpose or can be available in a number of specific configurations. For example, data processing resources can be available as physical computers or VM instances in a number of different configurations. The VM instances can be configured to execute applications, including web servers, application servers, media servers, database servers, gaming applications, some or all of the network services described above, and/or other types of programs. Data storage resources can include file storage devices, block storage devices, and the like. The service provider network 102 can also be configured to provide other types of computing resources not mentioned specifically herein.

The computing resources provided by the service provider network 102 may be enabled in one embodiment by one or more data centers 1004A-1004N (which might be referred to herein singularly as "a data center 1004" or in the plural as "the data centers 1004"). The data centers 1004 are facilities utilized to house and operate computer systems and associated components. The data centers 1004 typically include redundant and backup power, communications, cooling, and security systems. The data centers 1004 can also be located in geographically disparate locations, or regions 1006. One illustrative embodiment for a data center 1004 that can be utilized to implement the technologies disclosed herein will be described below with regard to FIG. 11.

The data centers 1004 may be accessible over any wired and/or wireless network(s), which can be a wide area communication network ("WAN"), such as the Internet, an intranet or an Internet service provider ("ISP") network or a combination of such networks. For example, and without limitation, a user of the service provider network 102 may access the service provider network 102 by way of the network(s) 142. It should be appreciated that a local-area network ("LAN"), the Internet, or any other networking topology known in the art that connects the data centers 1004 to remote clients and other users can be utilized. It should also be appreciated that combinations of such networks can also be utilized.

Figure 11:
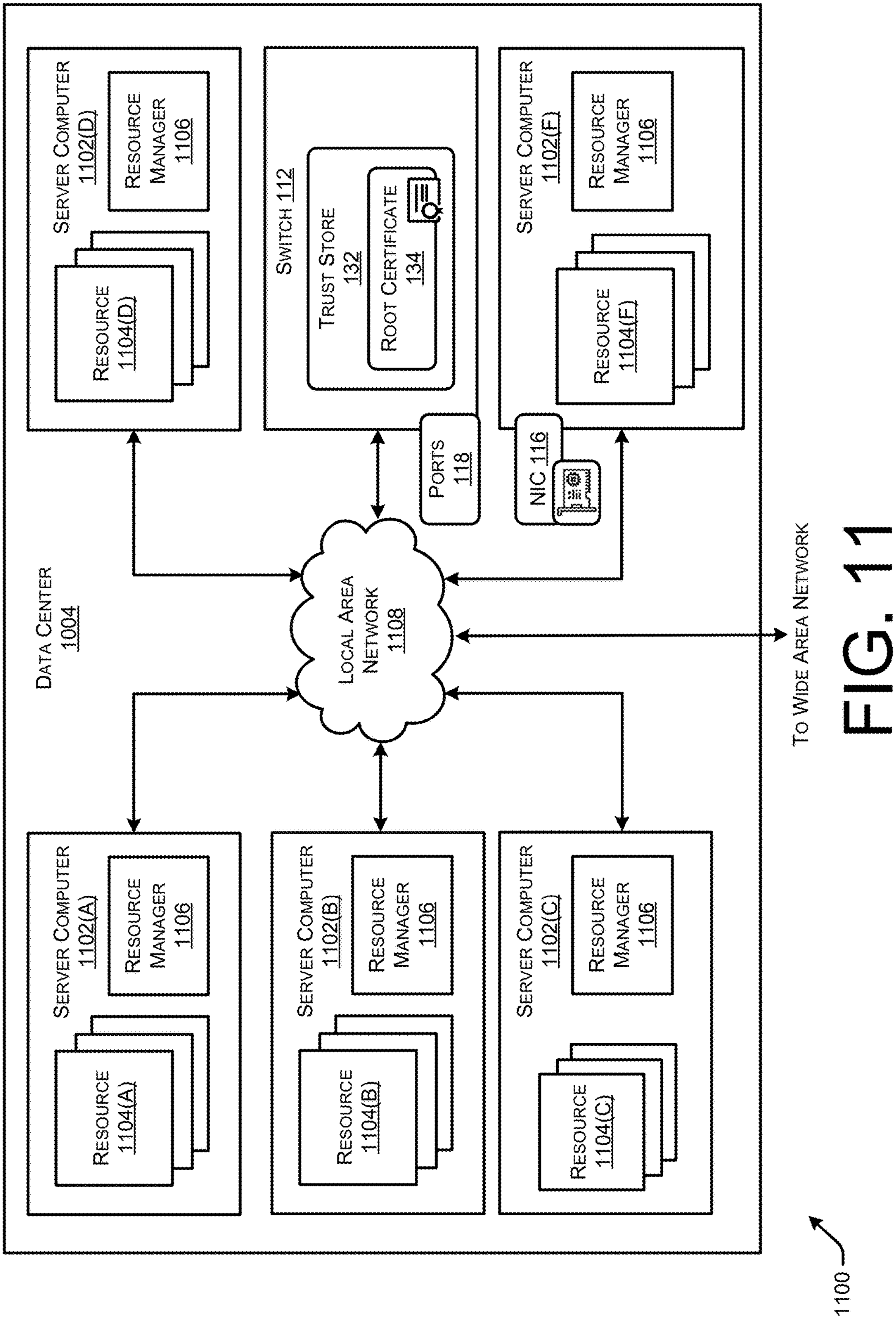
FIG. 11 is a computing system diagram illustrating a configuration for a data center that can be utilized to implement aspects of the technologies disclosed herein.

FIG. 11 is a computing system diagram 1100 that illustrates one configuration for a data center 1004 that implements aspects of the technologies disclosed herein. The example data center 1004 shown in FIG. 11 includes several server computers 1102A-1102F (which might be referred to herein singularly as "a server computer 1102" or in the plural as "the server computers 1102") for providing computing resources 1104A-1104E. In some examples, the resources 1104 and/or server computers 1102 may include, be included in, or correspond to, the servers 114 described herein.

The server computers 1102 can be standard tower, rack-mount, or blade server computers configured appropriately for providing the computing resources described herein (illustrated in FIG. 11 as the computing resources 1104A-1104E). As mentioned above, the computing resources provided by the service provider network 102 can be data processing resources such as VM instances or hardware computing systems, database clusters, computing clusters, storage clusters, data storage resources, database resources, networking resources, and others. Some of the servers 114 can also be configured to execute a resource manager 1106 capable of instantiating and/or managing the computing resources. In the case of VM instances, for example, the resource manager 1106 can be a hypervisor or another type of program configured to enable the execution of multiple VM instances on a single server computer 1102. Server computers 1102 in the data center 1004 can also be configured to provide network services and other types of services.

In the example data center 1004 shown in FIG. 11, an appropriate LAN 1108 is also utilized to interconnect the server computers 1102A-1102F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between each of the data centers 1004A-1004N, between each of the server computers 1102A-1102F in each data center 1004, and, potentially, between computing resources in each of the server computers 1102. It should be appreciated that the configuration of the data center 1004 described with reference to FIG. 11 is merely illustrative and that other implementations can be utilized.

The data center 1004 shown in FIG. 11 also includes a server computer 1102F that can execute some or all of the software components described above. For example, and without limitation, the server computer 1102F (and the other server computers 1102) can generally be included in the server 114 of FIG. 1 and be configured to execute components, including the components of the server 114, the data center fabric 120, the foundation services 126 the service provider network 102, and/or the other software components described above. The server computer 1102F can also be configured to execute other components and/or to store data for providing some or all of the functionality described herein. In this regard, it should be appreciated that the services illustrated in FIG. 11 as executing on the server computer 1102F can execute on many other physical or virtual servers in the data centers 1004 in various embodiments.

Figure 12:
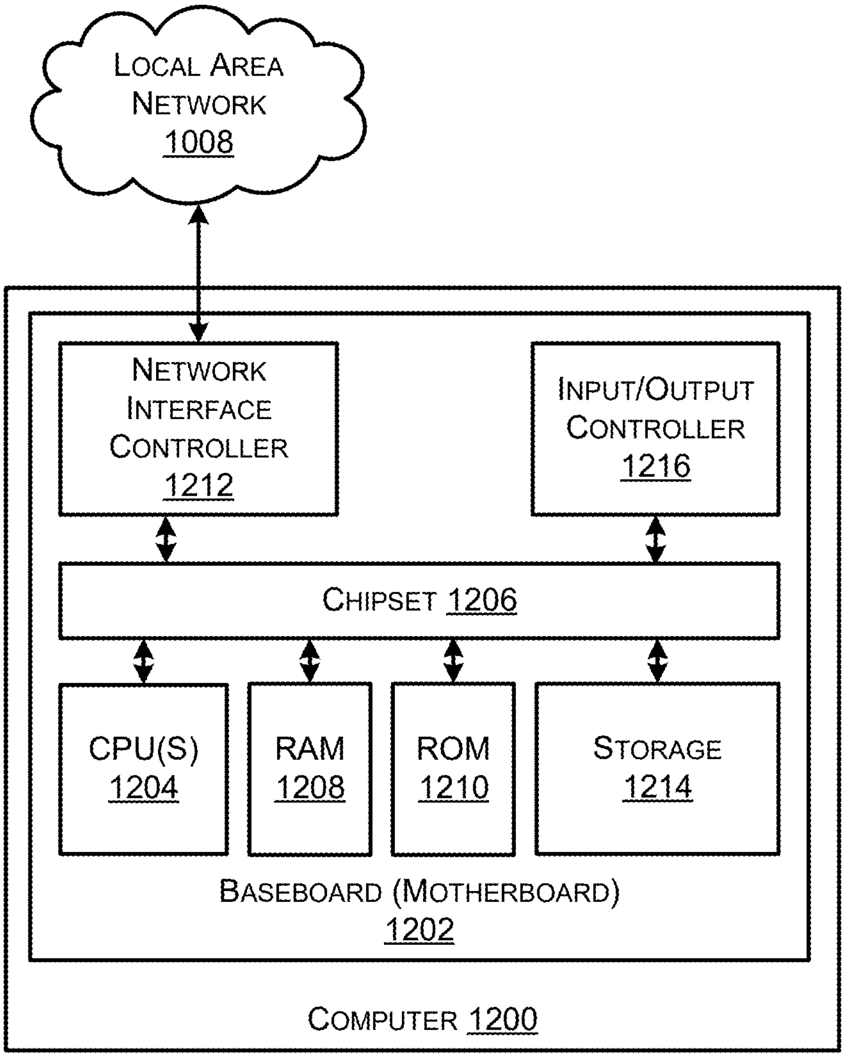
FIG. 12 is a computer architecture diagram showing an illustrative computer hardware architecture for implementing a computing device that can be utilized to implement aspects of the various technologies presented herein.

FIG. 12 shows an example computer architecture for a computer 1200 capable of executing program components for implementing the functionality described above. The computer architecture shown in FIG. 12 illustrates a conventional server computer, workstation, desktop computer, laptop, tablet, network appliance, e-reader, smartphone, or other computing device, and can be utilized to execute any of the software components presented herein. In some examples, the computer 1200 may correspond to, or be the same as or similar to, a switch 112, a server 114, and/or another device described in FIG. 1.

The computer 1200 includes a baseboard 1202, or "motherboard," which is a printed circuit board to which a multitude of components or devices can be connected by way of a system bus or other electrical communication paths. In one illustrative configuration, one or more central processing units ("CPUs") 1204 operate in conjunction with a chipset 1206. The CPUs 1204 can be standard programmable processors that perform arithmetic and logical operations necessary for the operation of the computer 1200.

The CPUs 1204 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1206 provides an interface between the CPUs 1204 and the remainder of the components and devices on the baseboard 1202. The chipset 1206 can provide an interface to a RAM 1208, used as the main memory in the computer 1200. The chipset 1206 can further provide an interface to a computer-readable storage medium such as a read-only memory ("ROM") 1210 or non-volatile RAM ("NVRAM") for storing basic routines that help to startup the computer 1200 and to transfer information between the various components and devices. The ROM 1210 or NVRAM can also store other software components necessary for the operation of the computer 1200 in accordance with the configurations described herein.

The computer 1200 can operate in a networked environment using logical connections to remote computing devices and computer systems through a network, such as the network 1108. The chipset 1206 can include functionality for providing network connectivity through a network interface controller (NIC) 1212, such as a gigabit Ethernet adapter. The NIC 1212 is capable of connecting the computer 1200 to other computing devices over the network 1108 (or data center fabric 120 and/or external networks 142). It should be appreciated that multiple NICs 1212 can be present in the computer 1200, connecting the computer to other types of networks and remote computer systems.

The computer 1200 can include storage 1214 (e.g., disk) that provides non-volatile storage for the computer. The storage 1214 can consist of one or more physical storage units. The storage 1214 can store information by altering the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1200 can further read information from the storage 1214 by detecting the physical states or characteristics of one or more particular locations within the physical storage units.

In addition to the storage 1214 described above, the computer 1200 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 1200. In some examples, the operations performed by the service provider network 102, and or any components included therein, may be supported by one or more devices similar to computer 1200. Stated otherwise, some or all of the operations performed by the service provider network 102, and or any components included therein, may be performed by one or more computers 1200 operating in a network-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The storage 1214 can store an operating system utilized to control the operation of the computer 1200. According to one embodiment, the operating system comprises the LINUX operating system. According to another embodiment, the operating system comprises the WINDOWS SERVER operating system from MICROSOFT Corporation of Redmond, Washington. According to further embodiments, the operating system can comprise the UNIX operating system or one of its variants. It should be appreciated that other operating systems can also be utilized. The storage 1214 can store other system or application programs and data utilized by the computer 1200.

In one embodiment, the storage 1214, RAM 1208, ROM 1210, and/or other computer-readable storage media may be encoded with computer-executable instructions which, when loaded into the computer 1200, transform the computer from a general-purpose computing system into a special-purpose computer capable of implementing the embodiments described herein. These computer-executable instructions transform the computer 1200 by specifying how the CPUs 1204 transition between states, as described above. According to one embodiment, the computer 1200 has access to computer-readable storage media storing computer-executable instructions which, when executed by the computer 1200, perform the various techniques described above. The computer 1200 can also include computer-readable storage media having instructions stored thereupon for performing any of the other computer-implemented operations described herein.

Generally, the computer 1200 may be an example of a server 114, a switch 112, and other computing devices, etc., described herein. The CPU(s) 1204, RAM 1208, ROM 1210, storage 1214, bandwidth of the NIC 1212, and/or other resources of the computer 1200 may be allocated to one or more different VM instances as described herein based on different VM instance types.

The computer 1200 can also include one or more input/output controllers 1216 for receiving and processing input from a number of input devices, such as a keyboard, a mouse, a touchpad, a touch screen, an electronic stylus, or other type of input device. Similarly, an input/output controller 1216 can provide output to a display, such as a computer monitor, a flat-panel display, a digital projector, a printer, or other type of output device. It will be appreciated that the computer 1200 might not include all of the components shown in FIG. 12, can include other components that are not explicitly shown in FIG. 12, or might utilize an architecture completely different than that shown in FIG. 12.

In some examples, the service provider network 102 may be or comprise a cloud provider network. A cloud provider network (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a separate geographical area in which the cloud provider clusters data centers. Each region can include two or more availability zones connected to one another via a private high-speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs can be considered as the primary backbone locations linking customers to the cloud provider network, and may be collocated at other network provider facilities (e.g., Internet service providers, telecommunications providers) and securely connected (e.g. via a VPN or direct connection) to the availability zones. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

With cloud computing, instead of buying, owning, and maintaining their own data centers and servers, organizations can acquire technology such as compute power, storage, databases, and other services on an as-needed basis. The cloud provider network can provide on-demand, scalable computing services to users through a network, for example allowing users to have at their disposal scalable "virtual computing devices" via their use of the compute servers and block store servers. These virtual computing devices have attributes of a personal computing device including hardware (various types of processors, local memory, random access memory ("RAM"), hard-disk and/or solid state drive ("SSD") storage), a choice of operating systems, networking capabilities, and pre-loaded application software. Each virtual computing device may also virtualize its console input and output ("I/O") (e.g., keyboard, display, and mouse). This virtualization allows users to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires. Users can choose to deploy their virtual computing systems to provide network-based services for their own use and/or for use by their customers or client.

The cloud provider network may implement various computing resources or services, which may include a virtual compute service, data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by users of the cloud provider network, which may be provisioned in user accounts.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A system for authenticating a network interface card (NIC) of a server in a data center fabric, the system comprising:

a Public Key Infrastructure (PKI) service of a network, the PKI service configured to perform first operations comprising:

performing an attestation handshake with the NIC of the server to verify that the NIC is trustworthy; and providing the NIC with a digital certificate based at least in part on the NIC being verified as trustworthy; and a Top-of-Rack (ToR) switch configured to perform second operations comprising:

storing a root certificate of the PKI service on the ToR switch, such that the ToR switch is a trust anchor for the PKI service;

detecting a link up event indicating that the NIC has connected to a port of the ToR switch;

applying a first access control list (ACL) to the port, wherein the first ACL defines a first set of permissions that allow the NIC to send traffic to foundation services associated with the data center fabric;

allowing, based at least in part on the first ACL, the NIC to perform the attestation handshake with the PKI service;

receiving the digital certificate from the NIC;

verifying, using the root certificate, a certificate chain of the digital certificate; and in response to verifying the certificate chain of the digital certificate, applying a second ACL policy to the port, wherein the second ACL defines a second set of permissions that are more permissive than the first set of permissions.

2. The system of claim 1, second operations further comprising:

identifying, from the digital certificate, Internet Protocol (IP) addresses and a Media Access Control (MAC) address with which the NIC is authorized to communicate; and constructing ACL entries in the second ACL using the IP addresses and the MAC address.

3. The system of claim 1, the second operations further comprising:

establishing a Link Layer Discovery Protocol (LLDP) communication link with the NIC, wherein the digital certificate is received via an identity Type-Length-Value (TLV) of a first LLDP message sent over the LLDP communication link; and sending, to the NIC and using LLDP communication link, a second LLDP message having an authentication status TLV that indicates that the NIC is authenticated to send traffic via the port.

4. The system of claim 1, the second operations further comprising:

detecting a link down event on the port; and applying the first ACL to the port based at least in part on the link down event.

5. A computer-implemented method comprising:

storing, at a network device associated with a network fabric, a root certificate of a Public Key Infrastructure (PKI) service such that the network device is a trust anchor for the PKI service, wherein the network device is a Top-of-Rack (ToR) switch;

determining that an end device has established a physical connection to a port of the network device;

applying, to the port, a first access control list (ACL) defining first permissions that allow the end device to send traffic to foundation services associated with the network fabric;

allowing, based at least in part on the first ACL, the end device to perform an attestation handshake with the PKI service that is included in the foundation services;

receiving a digital certificate from the end device;

authenticating, at the network device, the end device using the digital certificate and the root certificate; and in response to authenticating the end device, applying a second ACL policy to the port, wherein the second ACL defines second permissions that are more permissive than the first permissions.

6. The computer-implemented method of claim 5, further comprising:

identifying, from the digital certificate, an Internet Protocol (IP) address and a Media Access Control (MAC) address with which the end device is authorized to communicate; and generating, at the network device, an ACL entry in the second ACL using at least one of the IP address or the MAC address.

7. The computer-implemented method of claim 5, further comprising:

establishing a Link Layer Discovery Protocol (LLDP) communication link with the end device, wherein the digital certificate is received via an identity Type-Length-Value (TLV) of a first LLDP message sent over the LLDP communication link; and sending, to the end device and using LLDP communication link, a second LLDP message having an authentication status TLV that indicates that the end device is authenticated to send traffic via the port according to the second ACL.

8. The computer-implemented method of claim 5, further comprising:

detecting a link down event on the port; and applying the first ACL to the port based at least in part on the link down event.

9. The computer-implemented method of claim 5, further comprising:

identifying, from the digital certificate, metadata indicating a network policies that are to be applied to traffic sent from the end device via the port of the network device; and selecting, from a set of ACLs stored at the network device, the second ACL using the metadata that indicates the network policies.

10. The computer-implemented method of claim 9, further comprising:

determining, using the metadata, a quality of service (QoS) policy that is to be applied to the traffic sent via the port; and applying the QoS policy to the traffic sent from the end device and via the port.

11. The computer-implemented method of claim 5, further comprising:

periodically polling the end device using a cryptographic protocol handshake to verify that the end device has the digital certificate;

determining, using the cryptographic protocol handshake, that the end device does not have the digital certificate; and at least one of:

applying the first ACL to the port based at least in part on the end device not having the digital certificate; or closing the port such that the end device is unable to communicate traffic on the port.

12. The computer-implemented method of claim 5, wherein:

the network fabric is a data center fabric; and the end device is a network interface card (NIC) of a server that is connected to the ToR switch.

13. One or more non-transitory computer-readable media storing computer-executable instructions that, when executed by one or more processors, cause the one or more processors to perform operations comprising:

storing, at a network device in a network fabric, a root certificate such that the network device is a trust anchor for a certificate authority associated with the network fabric, wherein the network device is a Top-of-Rack (ToR) switch;

detecting an end device that has established a physical connection to a port of the network device;

applying, to the port, first network policies defining first rules for traffic sent from the end device;

receiving first traffic sent from the end device and destined to the certificate authority;

determining that the first network policies allow the first traffic to be sent from the end device and to the certificate authority;

allowing the end device to perform an attestation handshake with the certificate authority;

receiving a digital certificate from the end device;

authenticating, at the network device, the end device using the digital certificate and the root certificate; and in response to authenticating the end device, applying second network policies to the port that define second rules for traffic sent from the end device.

14. The one or more computer-readable media of claim 13, the operations further comprising:

identifying, from the digital certificate, an Internet Protocol (IP) address and a Media Access Control (MAC) address with which the end device is authorized to communicate; and generating, at the network device, an access control list (ACL) entry in an ACL that is included in the second network policies using at least one of the IP address or the MAC address.

15. The one or more computer-readable media of claim 13, the operations further comprising:

establishing a Link Layer Discovery Protocol (LLDP) communication link with the end device, wherein the digital certificate is received via an identity Type-Length-Value (TLV) of a first LLDP message sent over the LLDP communication link; and sending, to the end device and using LLDP communication link, a second LLDP message having an authentication status TLV that indicates that the end device is authenticated to send traffic via the port according to the second network policies.

16. The one or more computer-readable media of claim 13, the operations further comprising:

detecting a link down event on the port; and applying the first network policies to the port based at least in part on the link down event.

17. The one or more computer-readable media of claim 13, the operations further comprising:

identifying, from the digital certificate, metadata indicating the second network policies that are to be applied to traffic sent from the end device via the port of the network device; and selecting, from a set of network policies stored at the network device, the second network policies using the metadata.

18. The one or more computer-readable media of claim 17, the operations further comprising:

determining, using the metadata, a quality of service (QoS) policy that is to be applied to the traffic sent via the port; and applying the QoS policy to the traffic sent from the end device and via the port.

19. The one or more computer-readable media of claim 13, the operations further comprising:

periodically polling the end device using a cryptographic protocol handshake to verify that the end device has the digital certificate;

determining, using the cryptographic protocol handshake, that the end device does not have the digital certificate; and at least one of:

applying the first network policies to the port based at least in part on the end device not having the digital certificate; or closing the port such that the end device is unable to communicate traffic on the port.

20. The one or more computer-readable media of claim 13, wherein:

the network fabric is a data center fabric; and the end device is a network interface card (NIC) of a server that is connected to the ToR switch.

* * * * *